(12) United States Patent
van der Blom

(10) Patent No.: US 7,273,066 B2
(45) Date of Patent: Sep. 25, 2007

(54) VALVE CONNECTOR

(75) Inventor: Nicolass van der Blom, Birkerod (DK)

(73) Assignee: NVB International, Birkerød (DK)

( * ) Notice: Subject to any disclaimer, the term of this patent is extended or adjusted under 35 U.S.C. 154(b) by 579 days.

(21) Appl. No.: 10/635,433

(22) Filed: Aug. 7, 2003

(65) Prior Publication Data
US 2005/0265869 A1   Dec. 1, 2005

Related U.S. Application Data

(60) Division of application No. 09/939,170, filed on Aug. 24, 2001, now Pat. No. 6,631,729, which is a division of application No. 08/837,505, filed on Apr. 18, 1997, now Pat. No. 6,314,985, which is a continuation-in-part of application No. PCT/DK96/00055, filed on Feb. 2, 1996.

(30) Foreign Application Priority Data

Feb. 3, 1995   (DK) .................................... 0125/95
Sep. 12, 1995  (GB) ................................ 9518558.3

(51) Int. Cl.
*B60S 5/04* (2006.01)
(52) U.S. Cl. ...................... 137/231; 137/224
(58) Field of Classification Search ................ 137/223, 137/224, 231; 152/415, 416
See application file for complete search history.

(56) References Cited

U.S. PATENT DOCUMENTS 1,492,838 A   5/1924 Dilweg (Continued)

FOREIGN PATENT DOCUMENTS

DE   2544555   7/1977

(Continued)

*Primary Examiner*—John Rivell
(74) *Attorney, Agent, or Firm*—Knobbe, Martens, Olson & Bear, LLP

(57) ABSTRACT

A valve connector for coupling with inflation valves of vehicle tyres, comprising a housing, within the housing a coupling hole for coupling with an inflation valve, the coupling hole having a central axis and an outer opening, positioning means for positioning the inflation valve when coupled in the coupling hole, and an activating pin, which is arranged coaxially with the coupling hole, for depressing a central spring-force operated core pin of the inflation valve, a cylinder (303) having a cylinder wall provided with a pressure port which is connected to a pressure source, wherein the activating pin is shiftable between a proximal pin position and a distal pin position relative to the positioning means so as to depress the core pin of the inflation valve in its distal pin position and disengage the core pin of the inflation valve in its proximal pin position when the inflation valve is positioned by the positioning means, the activating pin is coupled with a piston (304) and the piston (304) is slidingly arranged in the cylinder (303) and is movable between a proximal piston position, which corresponds to the proximal pin position, and a distal piston position, which corresponds to the distal pin position. The piston (304) is disposed in the cylinder (303) between the pressure port and the coupling hole and is drivable from its proximal piston position to its distal piston position by the pressure supplied into the cylinder (303) from the pressure source, and that flow regulating means are provided for selectively interrupting or freeing a flow path between the pressure source and the coupling hole depending on the piston positions and are adapted such that the flow path is interrupted in the proximal piston position and the flow path is freed in the distal piston position at least when the inflation valve is positioned by the positioning means.

15 Claims, 15 Drawing Sheets

U.S. PATENT DOCUMENTS

Figure 1:
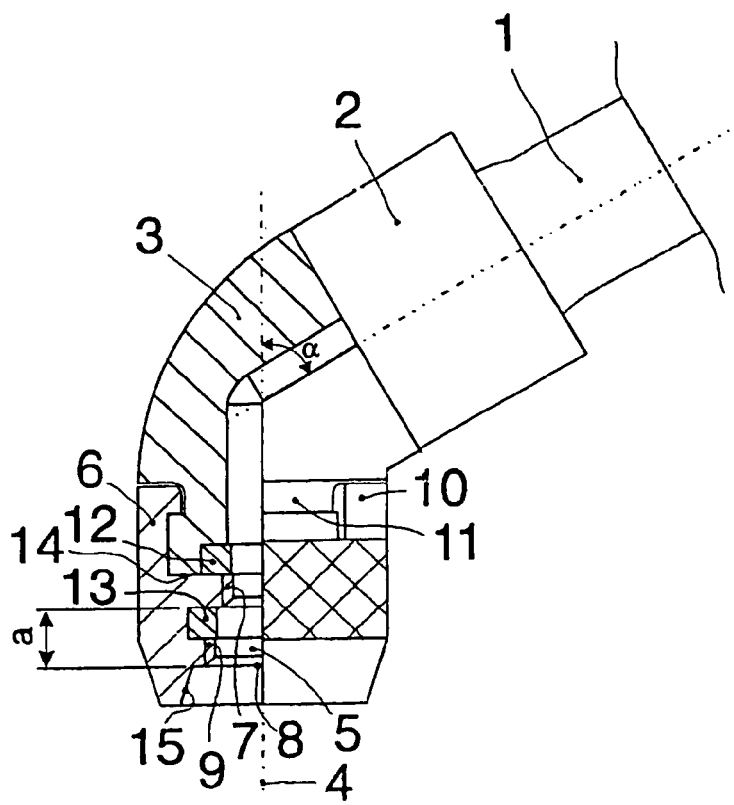

| | | |
|---|---|---|
| 1,850,111 A | 3/1932 | Kelsey |
| 2,025,067 A | 12/1935 | Miller |
| 2,257,498 A | 9/1941 | Hansen |
| 2,489,397 A | 11/1949 | Brummer |
| 2,685,906 A | 8/1954 | Williams |
| 2,716,998 A | 9/1955 | Knasko |
| 2,976,906 A | 6/1961 | Kamm et al. |
| 3,249,144 A | 5/1966 | Dobrikin |
| 3,926,205 A | 12/1975 | Gourlet |
| 4,088,147 A | 5/1978 | Krechel et al. |
| 4,165,760 A | 8/1979 | Guenthler |
| 4,489,855 A | 12/1984 | Boetger |
| 4,611,828 A | 9/1986 | Brunet |
| 4,662,412 A | 5/1987 | Swallert |
| 4,712,812 A | 12/1987 | Weir, III |
| 4,932,451 A | 6/1990 | Williams et al. |
| 4,932,849 A | 6/1990 | Scheffer |
| 4,938,272 A | 7/1990 | Sandy, Jr. et al. |
| 5,012,954 A | 5/1991 | Will |
| 5,094,263 A | 3/1992 | Hurrell, II et al. |
| 5,645,100 A | 7/1997 | Chuang et al. |
| 5,762,095 A | 6/1998 | Gapinski et al. |
| 5,778,923 A | 7/1998 | Marston |
| 5,785,076 A | 7/1998 | You |
| 5,819,781 A | 10/1998 | Wu |
| 5,983,920 A | 11/1999 | Gapinski et al. |

FOREIGN PATENT DOCUMENTS

| | | |
|---|---|---|
| DE | 3819771 | 7/1989 |
| DE | 19601952 A1 | 7/1997 |
| EP | 0240660 | 10/1987 |
| FR | 2653523 | 4/1991 |
| GB | 231992 | 4/1925 |
| GB | 872246 | 9/1961 |
| GB | 977139 | 12/1964 |
| GB | 1599304 | 9/1981 |
| GB | 2304844 | 3/1997 |
| WO | WO84/02968 | 8/1984 |
| WO | WO92/22448 | 12/1992 |
| WO | WO96/10903 | 4/1996 |
| WO | WO97/43570 | 11/1997 |

A-A

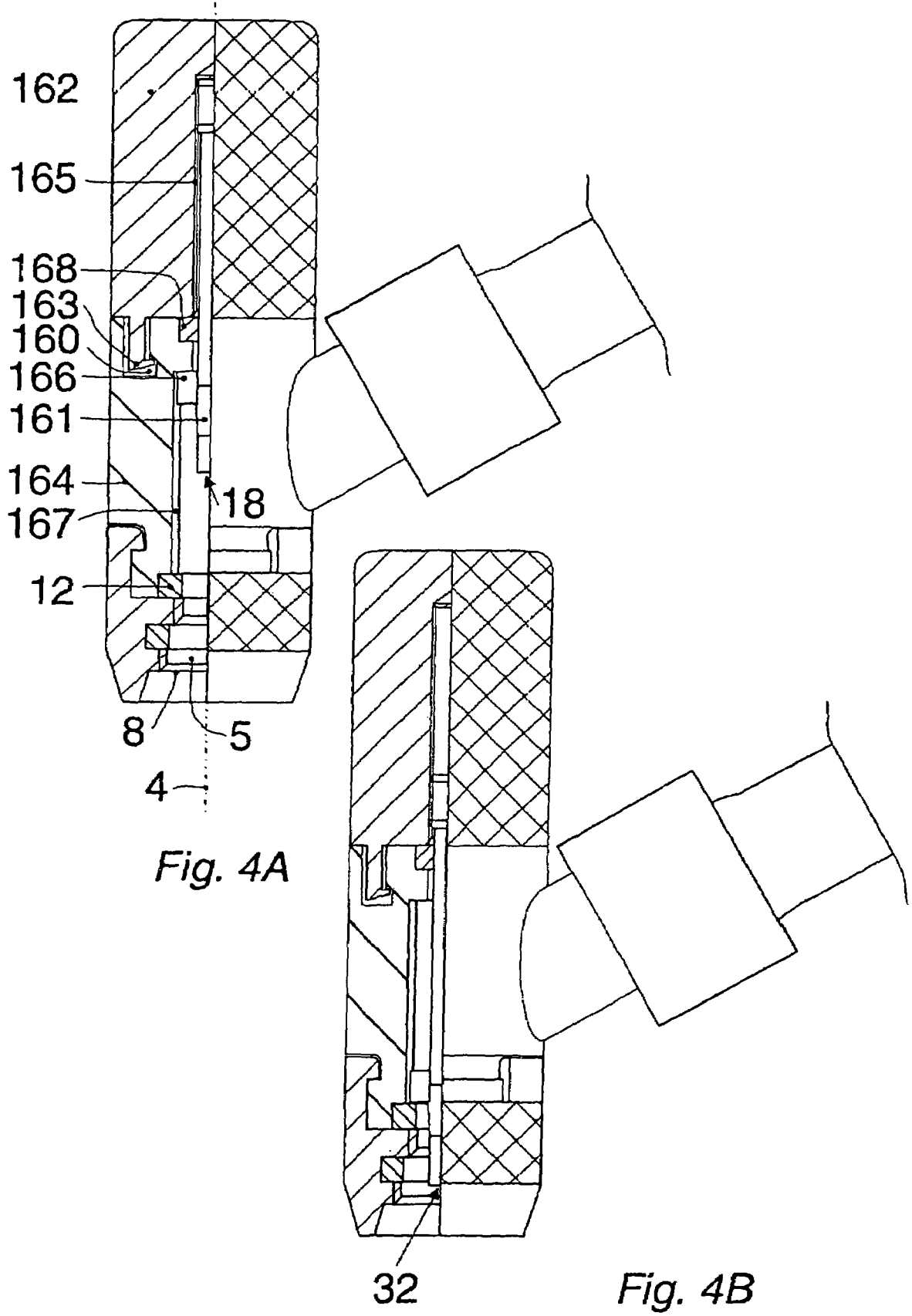

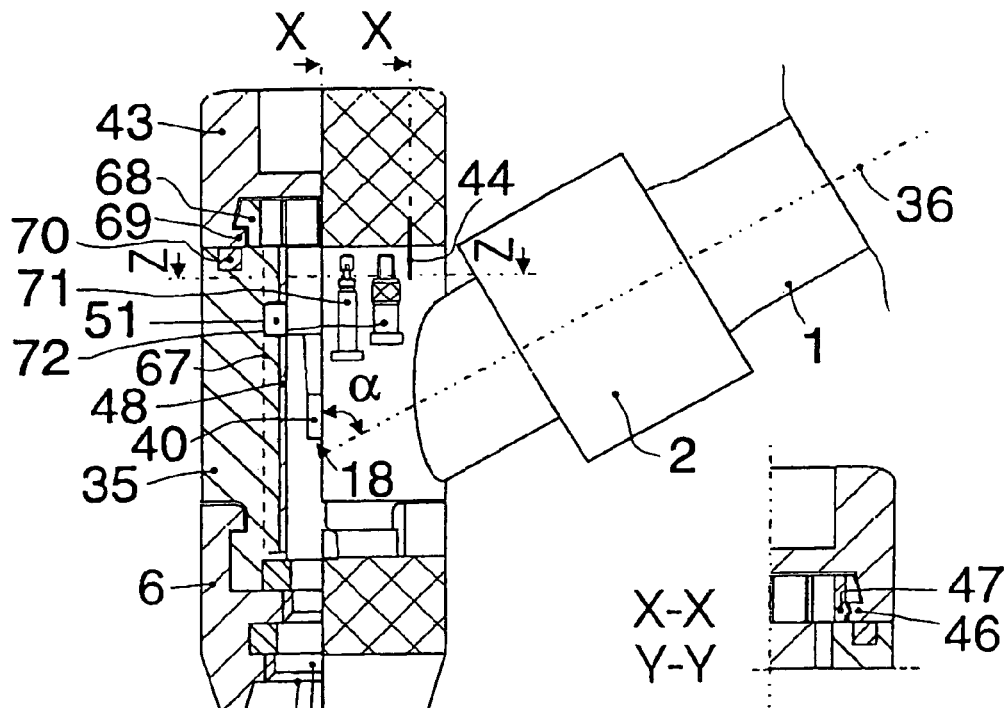
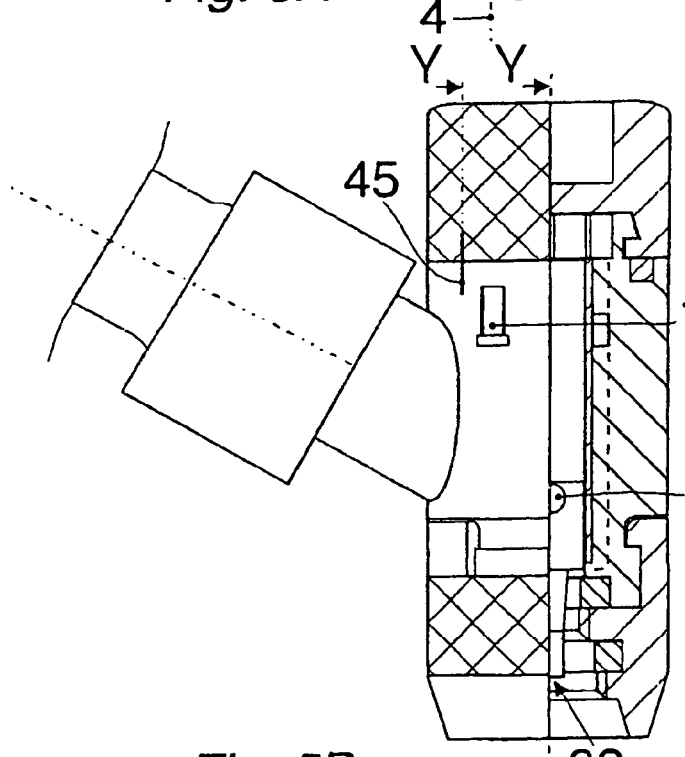
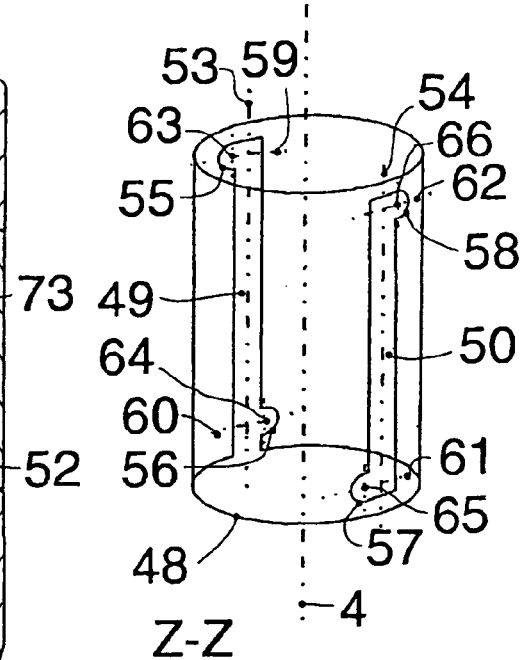
Fig. 5A
Fig. 6
Fig. 5B
Fig. 7

A-A, B-B

VALVE CONNECTOR

This application is a divisional application Ser. No. 09/939,170 filed on Aug. 24, 2001, now U.S. Pat. No. 6,631,729 which is a divisional of 08/837,505 filed on Apr. 18, 1997, now U.S. Pat. No. 6,314,985 which in turn was a Continuation-in-Part of PCT/DK96/00055 filed Feb. 2, 1996, the entire contents of which are hereby incorporated by reference.

TECHNICAL FIELD

The invention concerns a valve connector for inflation through varying valves of vehicle tyres according to the introduction to claim 1.

For reasons of clarity, some of the standards used will be cited. In the ISO standard No 10475:1992(E), thread for tyre inflation valves of vehicles is described. The most used threads are designated 5V2 (DIN:Vg 5,2), which has a nominal diameter of 5.2 mm and a pitch of 1.058 mm, and 8V1 (DIN: Vg 8), which has a nominal diameter of 7.7 mm and a pitch of 0.794 mm respectively. These thread types are used in the valve types of Dunlop-Woods, Sclaverand or Schrader. The last mentioned valve type is frequently used on common cars, where a spring-loaded pin head in the valve plug must be kept down in preparation of the passage of air, while pumping a tyre. For this purpose, the valve connector must be equipped with suitable means, which can serve this aim. Moreover, suitable means, e.g. a contra valve or the like, must be used to ensure that loss of air is avoided when activating the valve plug pin. The Sclaverand valve has—just like the Dunlop-Woods valve—the distinctive character that its plug pin is solely opened by air pressure. The necessary air pressure for opening a Sclaverand valve is up to 16 bar, and the valve is mostly used in connection with high-pressure tyres with a pressure of up to 16 bar. The opening pressure for the Dunlop-Woods valve is approximately 4 bar, which ensures that it is easier to open.

BACKGROUND OF THE INVENTION

Well-known valve connectors (e.g. GB-B-977,139) can only be connected to the Dunlop-Woods valve type and/or the Sclaverand valve type, or the Schrader valve type.

A well-known connector for a Schrader valve is of the type, where a rubber cylinder is tightly squeezed against the stem by means of a lever, which axially compresses the rubber cylinder. Consequently, the rubber cylinder is squeezed radially against the stem. With reference to different valve diameters, it is necessary, that auxiliary equipment (nut 6) is screwed onto or out of the valve thread to reduce or increase the internal diameter in advance to ensure the establishment of a connection from the valve connector to other valve diameters. Loose parts can disappear and can be loosened when used, if the pump hose is turned, so that the connection is no longer air-tight. The disadvantage of this connector type is that the user has to apply much strength when using the lever. It is necessary to use both hands to stabilize the (dis)connection.

GB patent application No 39808/77 shows an universal valve connector which can be screwed on all valve types. The thread (4) corresponding to 8V1 also keeps the bushing (26) in position. The bushing (26) has an internal thread (30) corresponding to 5V2 for Sclaverand or Dunlop-Woods valves. The plug pin of the Schrader valve is opened mechanically by means of a stationary pin indicated with (12). The disadvantage of this connector type is that the bushing (26) with a 5V2 thread has to be removed before connecting to a Schrader valve, and also that the bushing (26) must be mounted again before connecting to a Dunlop-Woods or Sclaverand valve. Also in this case loose parts are used. They can disappear and loosen when used, if the pump hose is turned, resulting in an untight connection.

From DE-B 38 19 771, a universal connector on a handpump with two coupling holes is known: one for Dunlop-Woods and Sclaverand valves and one for Schrader valves of which the plug pin is opened mechanically. The disadvantage of this way of coupling is firstly, that it cannot be fastened to a valve and secondly, that it can only be used in a certain position, where the coupling hole is turned almost vertically upwards, and finally that the user has to find out which of the two holes to use for the valve in question.

Another well-known universal valve type, which, apparently, does not exist in the patent literature, is of the same type as the one of the above mentioned GB patent application No. 39808/77. This rubber cylinder consists of two adjacent parts of different diameter and length, fitting on 5V2 and 8V1 threads, respectively. Axially, proximally staggered on the centre line of the holes it is possible to mount a means, which can open the plug pin of a Schrader valve. The disadvantage of this coupling is partly that both hands must be used to stabilize the (dis-)connection of Dunlop-Woods or Sclaverand valves and partly that the rubber cylinder must be taken out of the housing and turned upside down to make connection to valves with different thread types possible, so that the coupling place for connecting the valve is always positioned closest to the opening of the coupling hole. Also, the pin which mechanically opens the Schrader valve has to be turned in the above-mentioned operation. This is a problem for the ordinary user, as both means must be positioned correctly in relation to each other in order to be able to connect the coupling to a valve: combinatorily, there are four possibilities to select from, which can only be done correctly if a user manual is available. Apart from that, the above-mentioned means can be lost, loosened or disappear in the said operation.

From WO-A-92/22448 it is known to provide a sealing means, which is placed in a single level, and from GB-B-977.139 a valve connector operated by a lever cam is known. Common to both prior art references is that they can only be used together with a Schrader valve, and that neither Sclaverand type nor Dunlop-Woods type valves can be served by this type of connector, as the sealing means only show one diameter fitting e.g. the Schrader valve.

THE OBJECT OF THE INVENTION

Inflating a tyre is a problem to many people, especially if the tyres have different valve types, and only one pump has to be used. This is the case in most house-holds. The aim of the invention is to provide a valve connector which fits on all current valve types, which is easy to operate, is economical, and which has the possibility of automatically adjusts itself to the valve in question. Also, it should be possible to use the connector with existing pumps.

According to the invention this task is solved by means of the provisions in the characterising part of claim 1.

By a connector for inflation valves of vehicle tyres, where the connector consists. of a housing connected to a pressure source, preferably a hand or foot pump, and with a coupling hole with a diameter corresponding to the diameter of the valve to which it is connected, where the coupling hole is equipped with a securing means for securing on the valve and a sealing means against valves of different sizes, the invention is provided by the fact that the sealing means is mounted coaxially in the connector housing and is established on at least two parallel separate levels having the centre line of the connector housing, which is coaxial to the centre line of the valve when used, as its normal, where the internal diameter of the sealing means approximately corresponds to the external diameter of the present valve dimensions, on which the connector is mounted when used, that the sealing means which is nearest to the opening of the coupling hole in the connector housing has the biggest diameter, while the sealing means which is farthest from the opening of the coupling hole in the connector housing has the smallest diameter, and diameters between the extremes are lying in corresponding separate distances between these extremes. The coupling place on a valve, which is to be connected, is positioned against a sealing surface on the sealing means in the coupling hole of the concerned valve. The connector has only one coupling hole. The use of it is therefore simple, even without a user manual, and loose nipples are superfluous. Therefore, a connection can always be established in only one operation.

In an appropriate embodiment of the invention, it is suggested that the securing means is a rotational bushing mounted on the housing, which is equipped with a thread in the coupling hole, which fits on the respective valves, and which is sealed with the sealing means against the connector housing, which is farthest from the coupling hole in the connector housing. The connector can be positioned here on the valve with an airtight connection, which does not become untight, when the connected hose is turned. In addition, mounting is quickly accomplished without applying significant strength. (Dis)-Connecting of the coupling can be done using only one hand.

To reduce the wear of the gasket seal surface in the connector housing and also to reduce the force by means of which the rotational bushing has to be turned, and furthermore to ensure a reliable sealing against valves with 5V2 thread, a still more appropriate embodiment suggests that the innermost thread is provided by a bushing with a 5V2 thread, where the bushing is embedded and—slightly—axially sliding in a taper milling in the rotational coupling bushing and is coupled rotational-free to the coupling bushing by means of a set of ribs, which are distributed around the bushing circumference, and which are geared into corresponding grooves in the coupling bushing, and that the sealing means rests on a stepped milling. This ensures that frictional forces do not occur between the gasket seal and the coupling bushing during the main part of its fastening and unscrewing, whereas the coupling bushing is pulling the connector housing and its gasket seal against the valve when tightening. Tightening occurs against the core of the valve thread and is stabilized as a result of the reduced radius of the inner part of the gasket seal.

In order to be able to use the valve connector on a Sclaverand type valve, which is not standardized, i.e. some of the threads are removed thereby forming two parallel secants on each side of the Sclaverand type valve, a further development of the inner bushing is suggested, whereby the inner bushing is running in an undercut grove in the valve housing. Such Sclaverand type valve can not tighten against the sealing means, and the presurized air will try to escape through the secant openings. By running in the undercut grove the bushing will tighten against this when mounting the valve connector on the valve.

In connection with the (dis)connection with only one hand, almost the same is valid, if the connector is provided by means of temporary thread, i.e. created by squeezing e.g. a rubber cylinder against the existing valve thread of which the securing means and sealing means in a well-known way consist of the bushing of a deformable material positioned in the housing, preferably a rubber type material shaped like a "H", and that a piston is mounted proximally to the valve and the rubber bushing which has two extremes to establish an axial compression and release of the rubber bushing, and also a lever for activating the piston, where the axis of the lever is placed perpendicularly to the centre line and excentrical with this, and that the lever for activating the piston is turned from a position forming an angle $\Psi$ with the centre line to a position almost perpendicular to the centre line, where a locking means of the lever is working together with a corresponding locking means of the housing, whereby the locking means of the lever, as an example, is provided in the construction of the lever. In a special advatageous embodiment a reaction arm is applied to absorb the reaction forces originating from the movement of the lever arm between the two positions. This measure ensures a reliable securing and a simple operation.

With this embodiment of the connector, it is possible to mount same, using just one hand, as the lever is taken down to its locking position by just a simple squeezing of the lever and the reaction arm parallel to the hose connection on the connector housing. By this action the piston is pressed against the rubber bushing, which is tightly squeezed radially against the concerned valve.

In an improved embodiment of the valve connector, the rubber bushing is provided with at the least one external V-shaped incision in the circumference perpendicular to the center axis close to those parts sqeezing against the threads of the valve. Through such incisions the rubber bushing is predetermined to excert the largest radial force against the threads exactly where the incisions are, and the user of the valve connector will experience a soft working lever arm. In order to support this purpose further and securing the valve connector on the valve even under high pressures it is suggested, that a preferably torroidal shaped ring is arranged in the incisions, thereby stressing the excerted radial forces.

The embodiment with the lever arm is designated: a torque-free (dis)-connection, as the valve may not carry any torque by the (dis)-connection. Connection to almost all valves is possible, as such connector type might be able to open a plug pin in such Schrader valve, which is opening at an air pressure of approximately 5-6 bar. The air pressure in the pump hose is of the same magnitude as when a high-pressure tyre provided with a Sclaverand valve is inflated. This is optimally achieved by using a high-pressure hand or foot-operated bicycle pump. There are plug pin types which cannot be opened by means of air pressure of an ordinary bicycle pump (e.g. 10 bar max.). Connecting can be done easily and comfortably in two ways. Either the last mentioned plug type is being replaced with the first mentioned one and the embodiments of the invention without a pin are being used as a connector, or the plug can—according to an appropriate embodiment of the invention—be opened by a pin placed in continuation of and coaxially to the centre line of the connector housing, which is transported by axial shifting from a position farthest from the valve (FIG. 4A) to activate the central pin head of the plug (FIG. 4B). By this embodiment, the necessary pumping force is considerably lower, when a Schrader valve is to be inflated, because no air pressure is used for opening the valve. Inflation can therefore be done with an ordinary bicycle pump.

As a means for automatic sliding the activating pin in the housing from a passive to an active position, the activating pin is constructed as a piston equipped with a suitable securing means and a piston rod, which can slide in the cylinder shaped housing, and which, without any physical load, is held in a sealing longitudinal position against the cylinder wall, so that the sliding of the piston after the connection of the valve connector occurs by means of the compressed air which is transported from the pressure source, and so that the piston in the position farthest from the wheel valve seals less than 100% against the cylinder wall.

With a valve connector according to claim 1 equipped with such automatic sliding activating pin it is possible to mount the valve connector equipped with a valve to a compressor hose, which can be available to the public known, e.g. from bicyckle shops, etc. There, it is not necessary to fasten the valve connector to the valve, as the user excerts the pressure necessary to secure an airtight connection.

With such valve connector, inflating tyres without the user having to identify the valve type and functioning has become possible. The operation conveniency has also increased significantly, and it will now be easier for the user to inflate the tyre to the correct pressure, which in general eases the driving and reduces tyre abrasion. At the same time, a contra valve function is added to the Schrader valves in that the valve only opens the core of the Schrader valve when sufficient air pressure is fed from the pressure source and air thus cannot escape from the tyre during inflation.

In an appropriate embodiment of the valve connector according to the invention, it is suggested that the piston is constructed with a central, axially sliding valve, which is elastically pressed to a closing position against the piston top. This provides a well-defined opening zone, which is not influenced by abrasion in the piston guide, and the increasing opening of the core secures the passage of compressed air from the pressure source as well.

As an example, the central, axially sliding valve on the piston can in a suitable way be activated by the fact that the piston valve is levered with a valve lever, which reaches excentricly through the piston, and by the fact that a spring between the piston and its valve keeps the valve closed when the piston does not influence the core in the wheel valve.

Alternatively, the piston valve can be levered with a core pin which concentricly reaches axially through the piston, where a spring leads it to a position distally from the piston. It has thus become possible to provide the piston with a reliable function within the limits established by the ISO standard, as the piston with the core pin automatically adjusts its length to the limits of the valve in question.

The latter embodiments ensure a safe functioning of the valve lever, because it is enclosed and only influenced by axially directed forces. Also, the bridge on the Schrader valve can be used for activating the piston valve. Further, the reaction forces from the piston is led to the air and not to the mechanical constructions.

The Schrader valve has the biggest major diameter of the external thread (thread type ISO 4570/3 8V1, ISO 10475: 1992-12V1 resp.) and the coupling place is closest to the opening of the coupling hole. The Dunlop-Woods plugs and the Sclaverand valves have the same thread type, where the major diameter of the external thread (thread type ISO 4570/2 5V2) is smaller than the minor diameter of internal thread 8V1. Therefore, it is possible that the Dunlop-Woods plug type and the Sclaverand valve type can pass both the coupling place of 8V1 threads and 12V1 threads. Consequently, the coupling place of the connecting of 5V2 thread is farthest from the opening of the coupling hole. The 5V2 thread of the Dunlop-Woods plug (both the type which is DIN normed and the type which in daily language is called the 'ball valve'), is sufficiently sticking out over the nut 8V1 which is keeping the plug to the stem and of which the major diameter is less than the minor diameter of the internal thread for the 12V1 thread in the bushing. There is, therefore, enough space for at least two thread types each with a corresponding seal ring. The same applies for the squeezing connections, according to the invention, where the connector is squeezed to form a temporary thread. The said 8V1 nut cannot pass the coupling place of the Schrader valve. That is due to the fact that the major diameter of the said nut is bigger than the diameter of the biggest hole in the rubber cylinder (a major diameter of external thread 8V1). The beginning of the coupling place of the 5V2 thread is at distance a from the opening of the coupling hole. As the load on the connection is low, it is not necessary to use the entire length of the internal thread, as generally accepted rules say 0.8 × of the size of the coupled external thread. This rule is based on mechanical constructions which are high-loaded and where the thread is fastened by a wrench. It is therefore possible that the coupling place of the 5V2 thread is behind the coupling place of the 8V1 thread.

The invention can exist in a number of embodiments which will appear from the dependent claims.

SPECIFICATION OF THE DRAWINGS

Figure 2A:
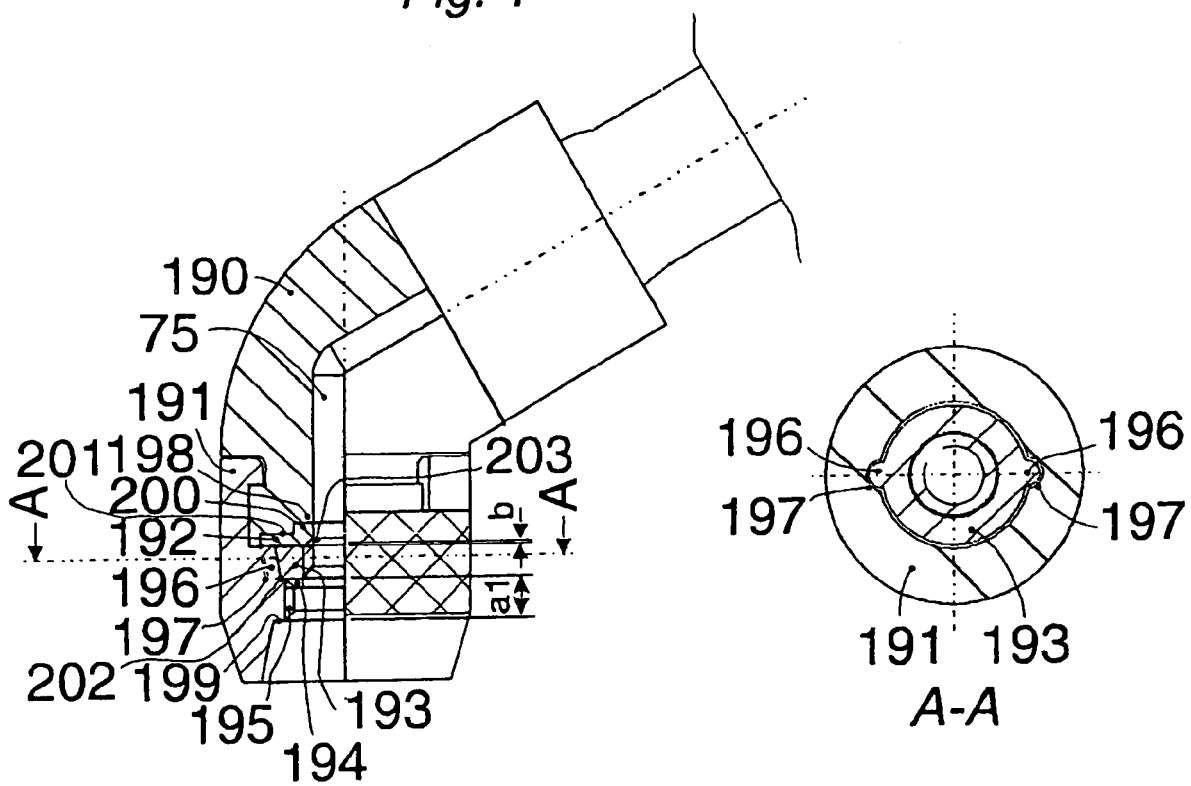
Figure 2B:
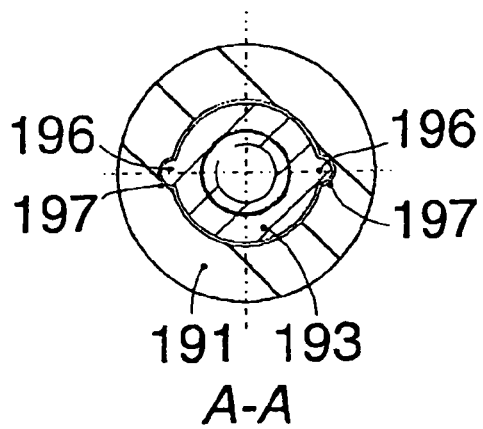
Figure 3:
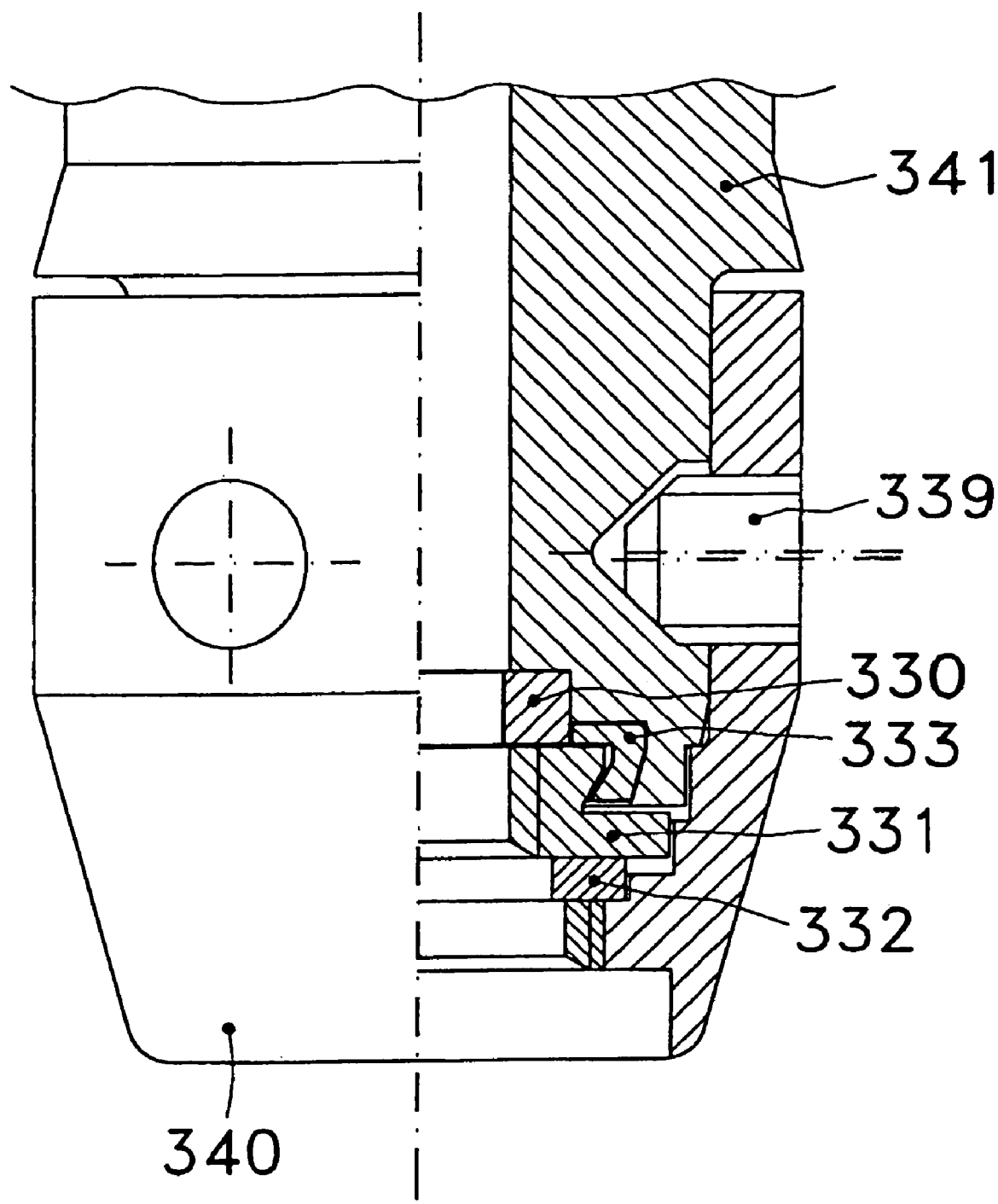
Figure 8:
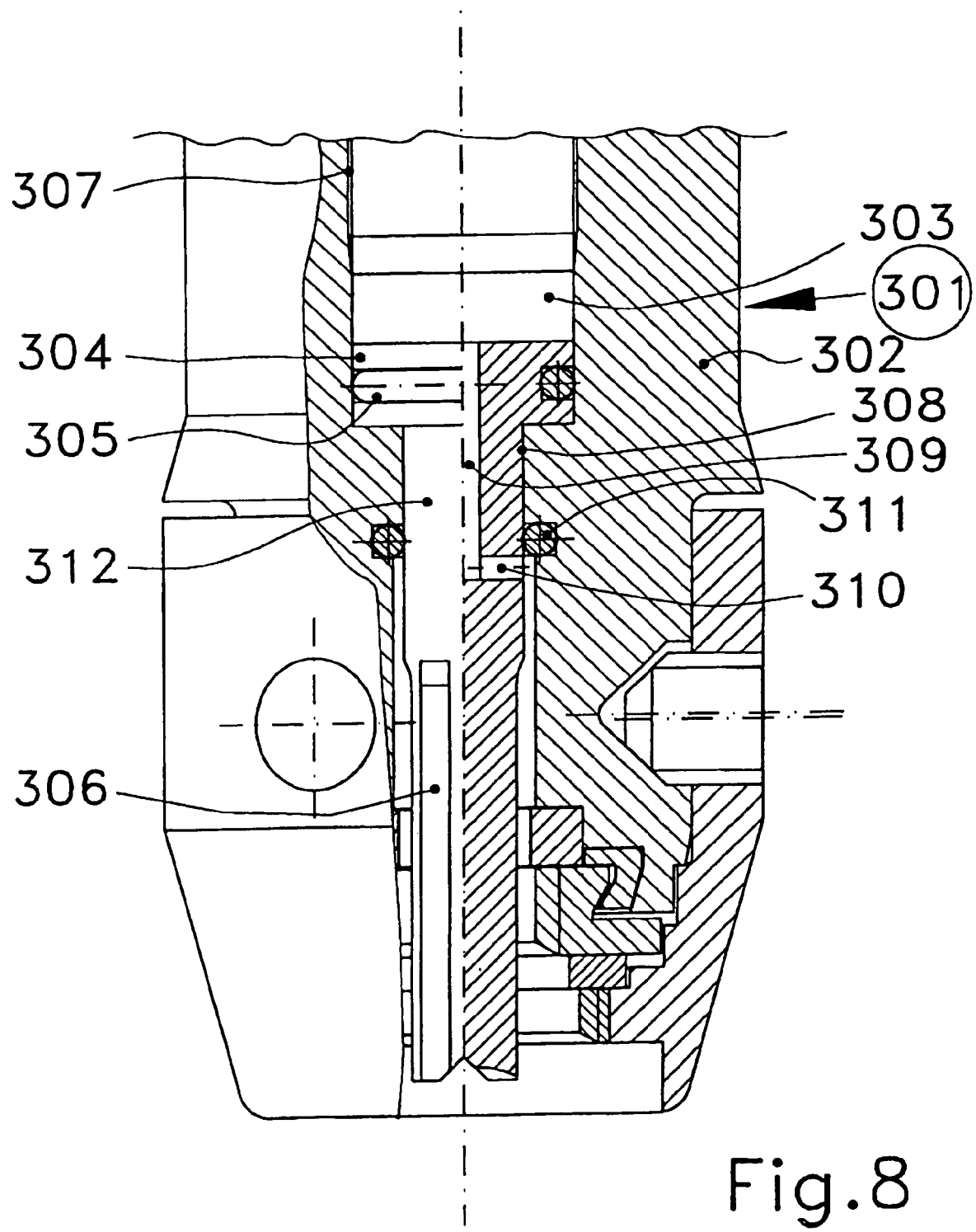
Figure 9:
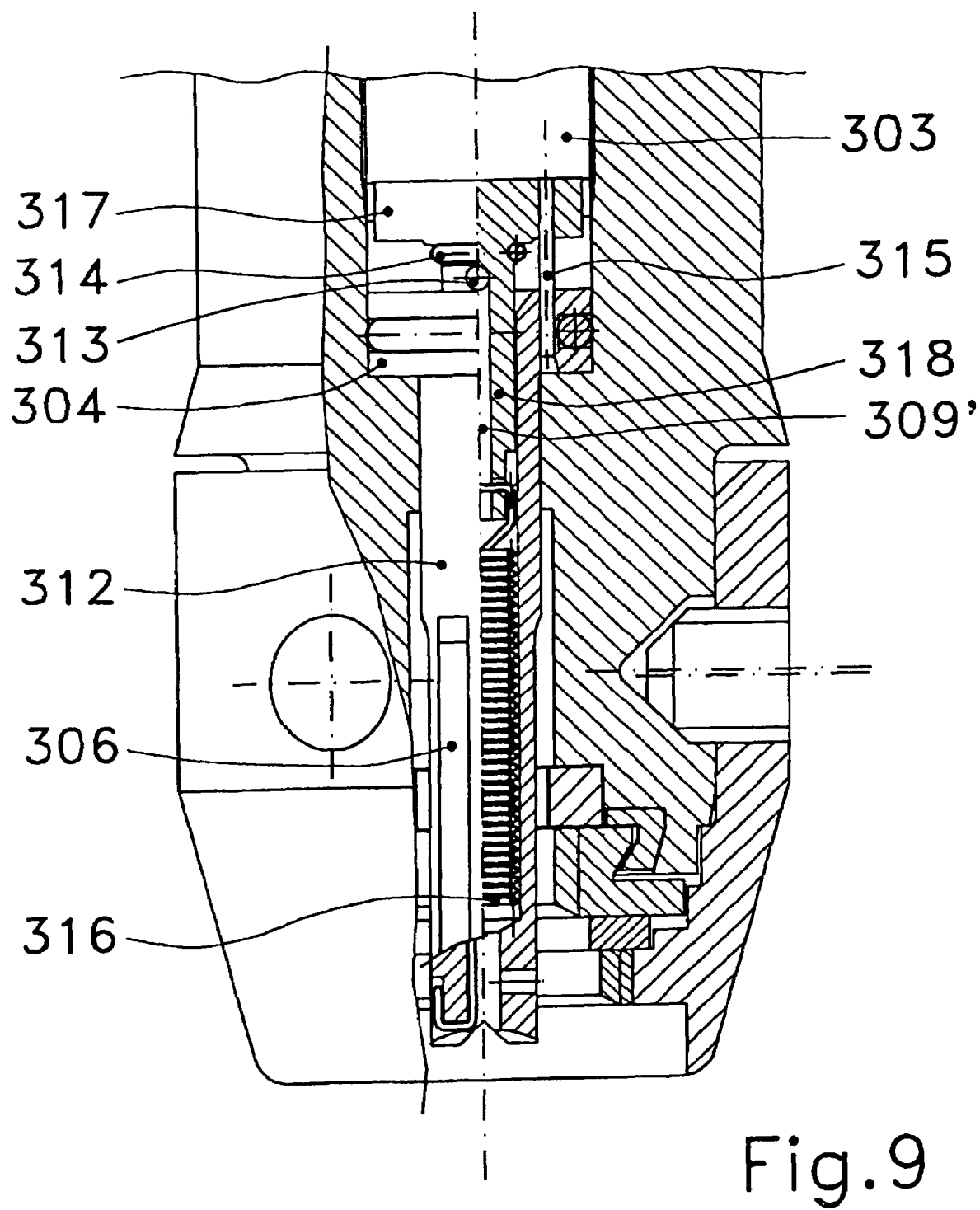
Figure 10:
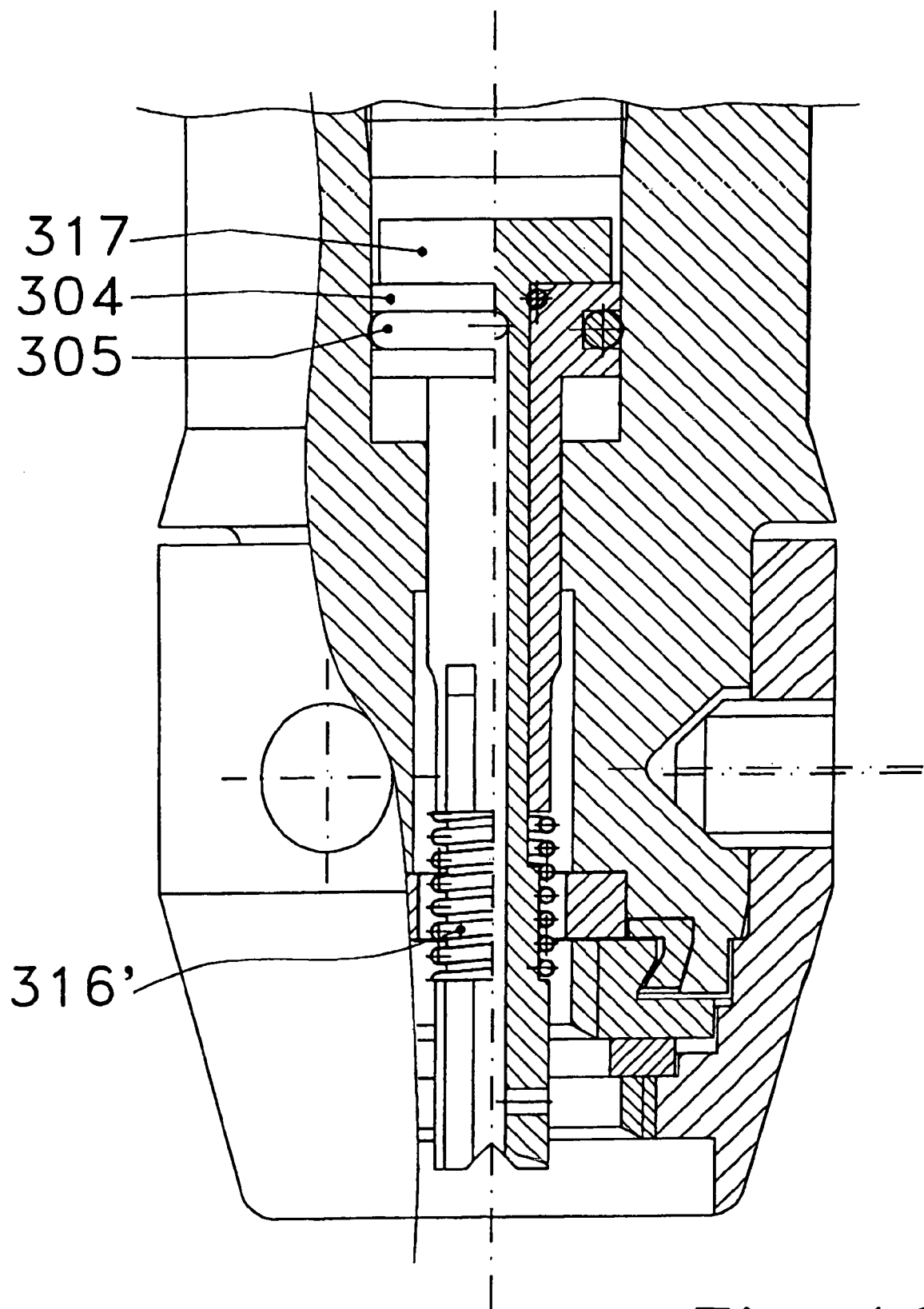
Figure 11:
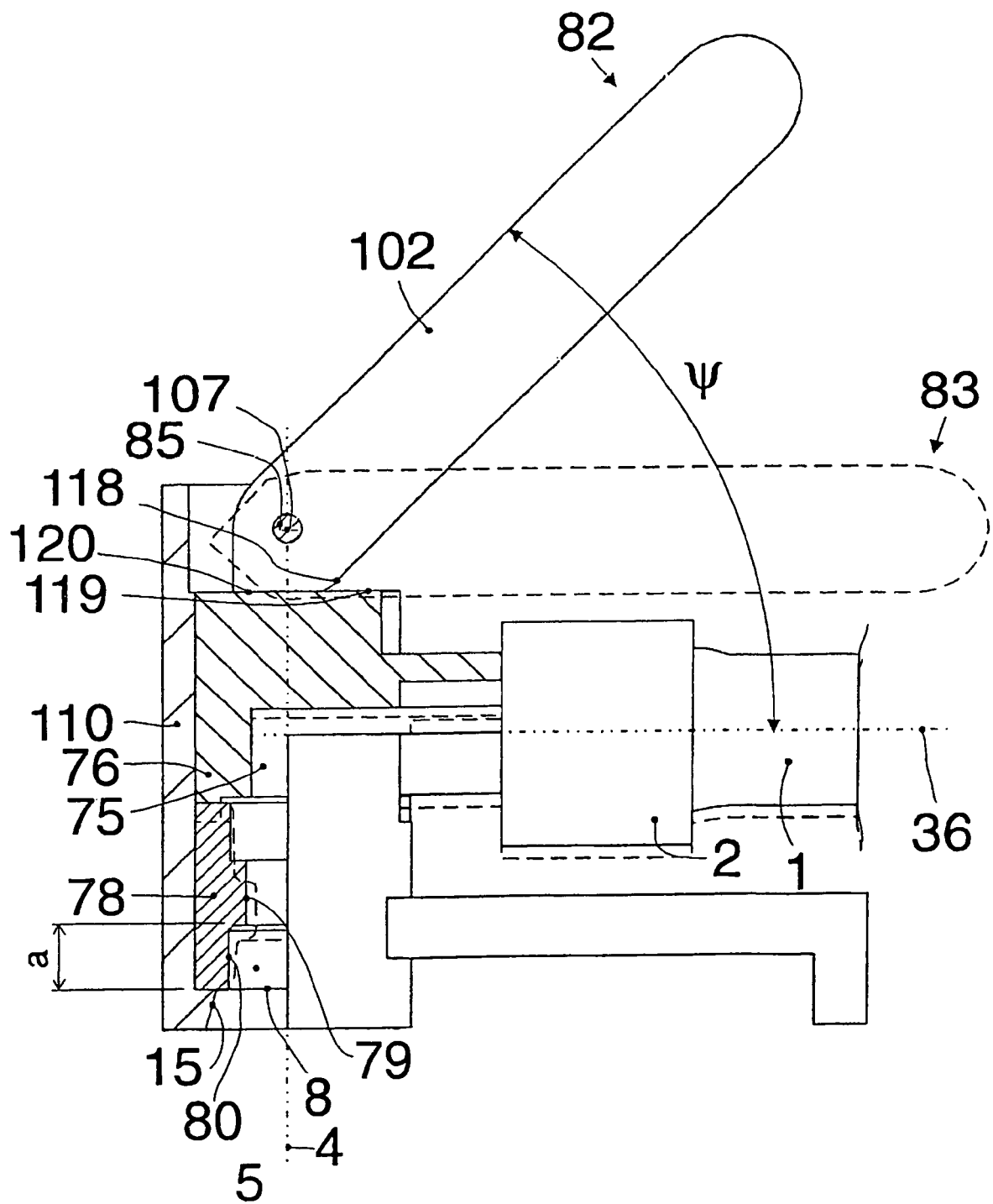
Figures 12A, 12C:
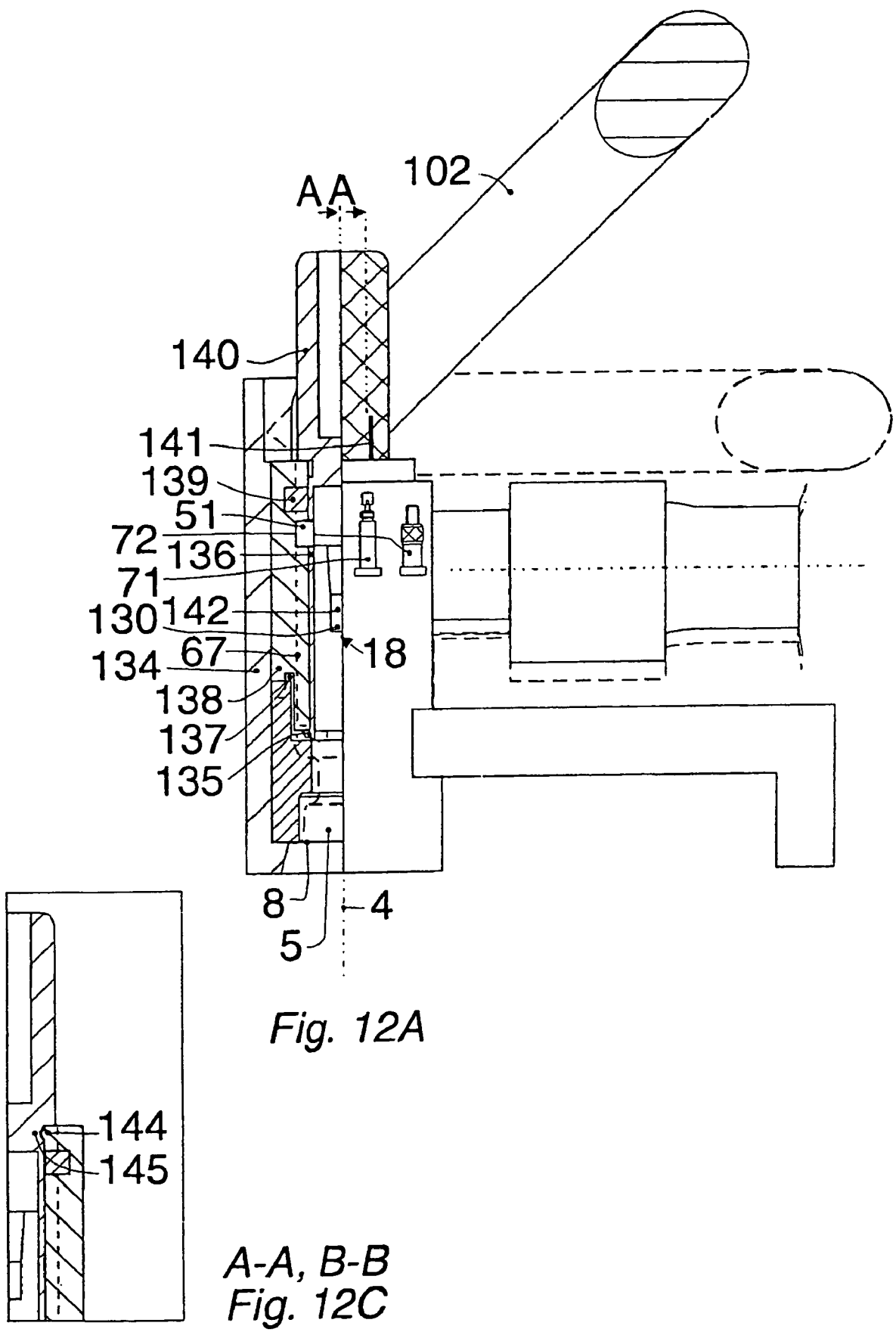
Figure 12B:
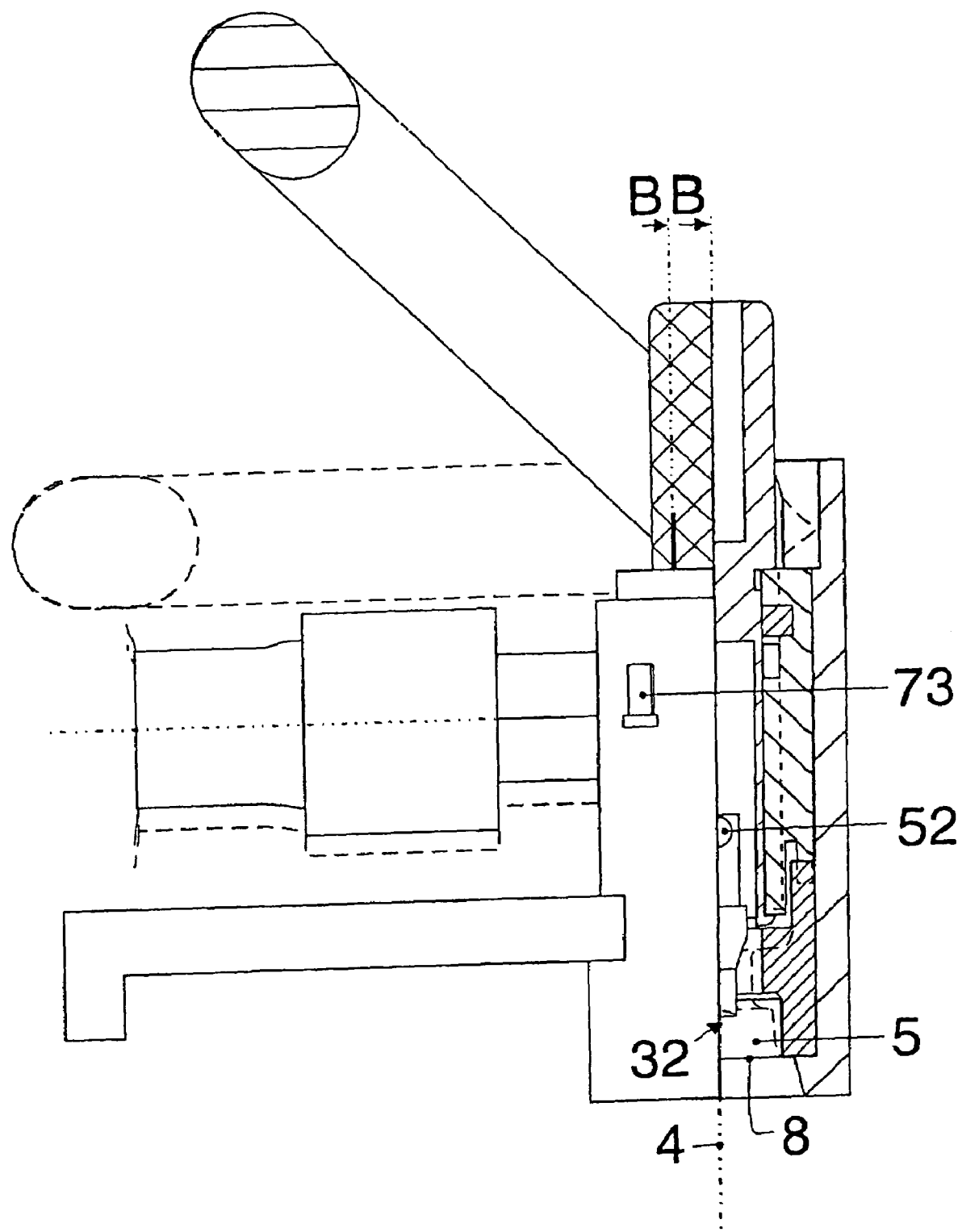
Figure 13:
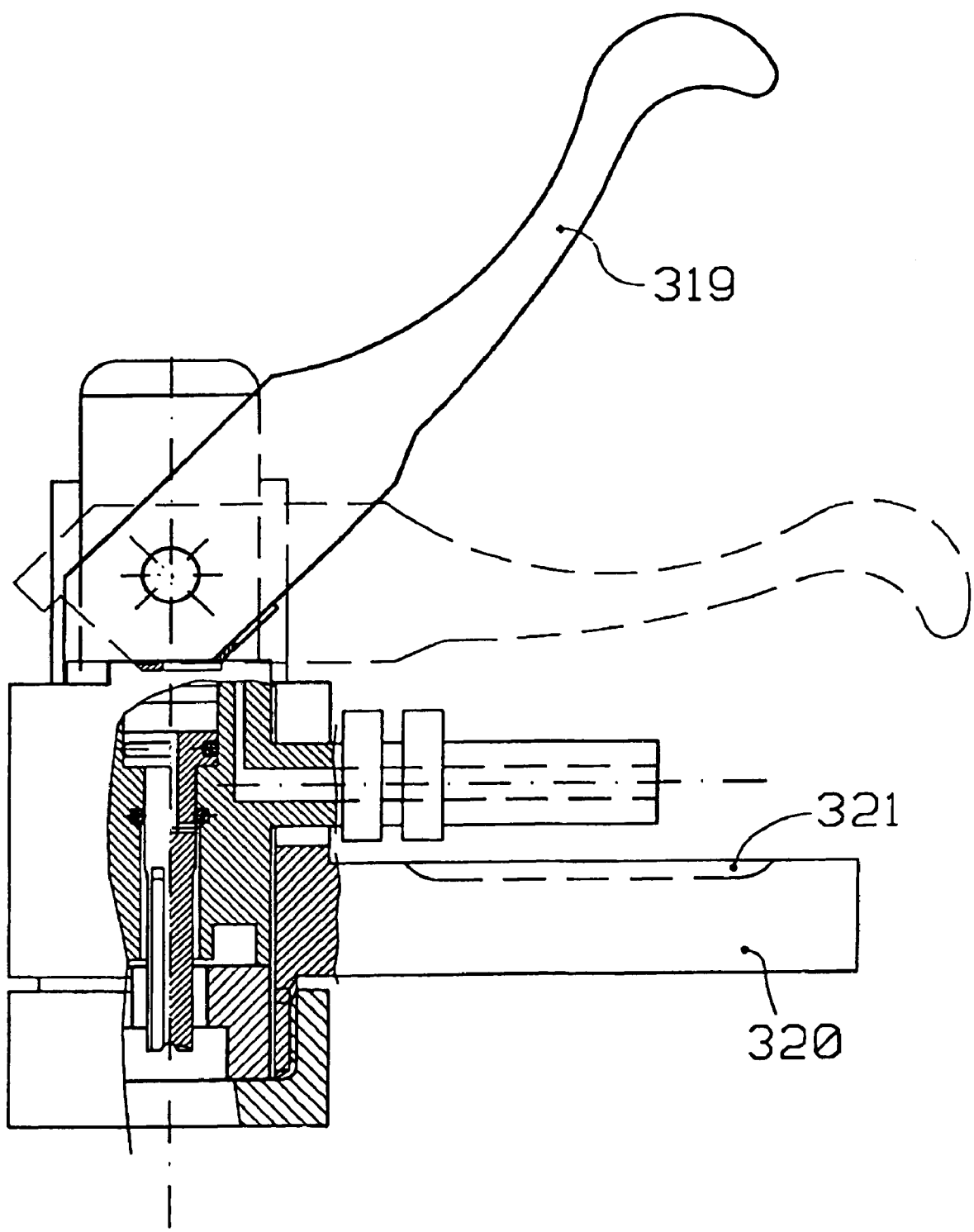
Figure 14:
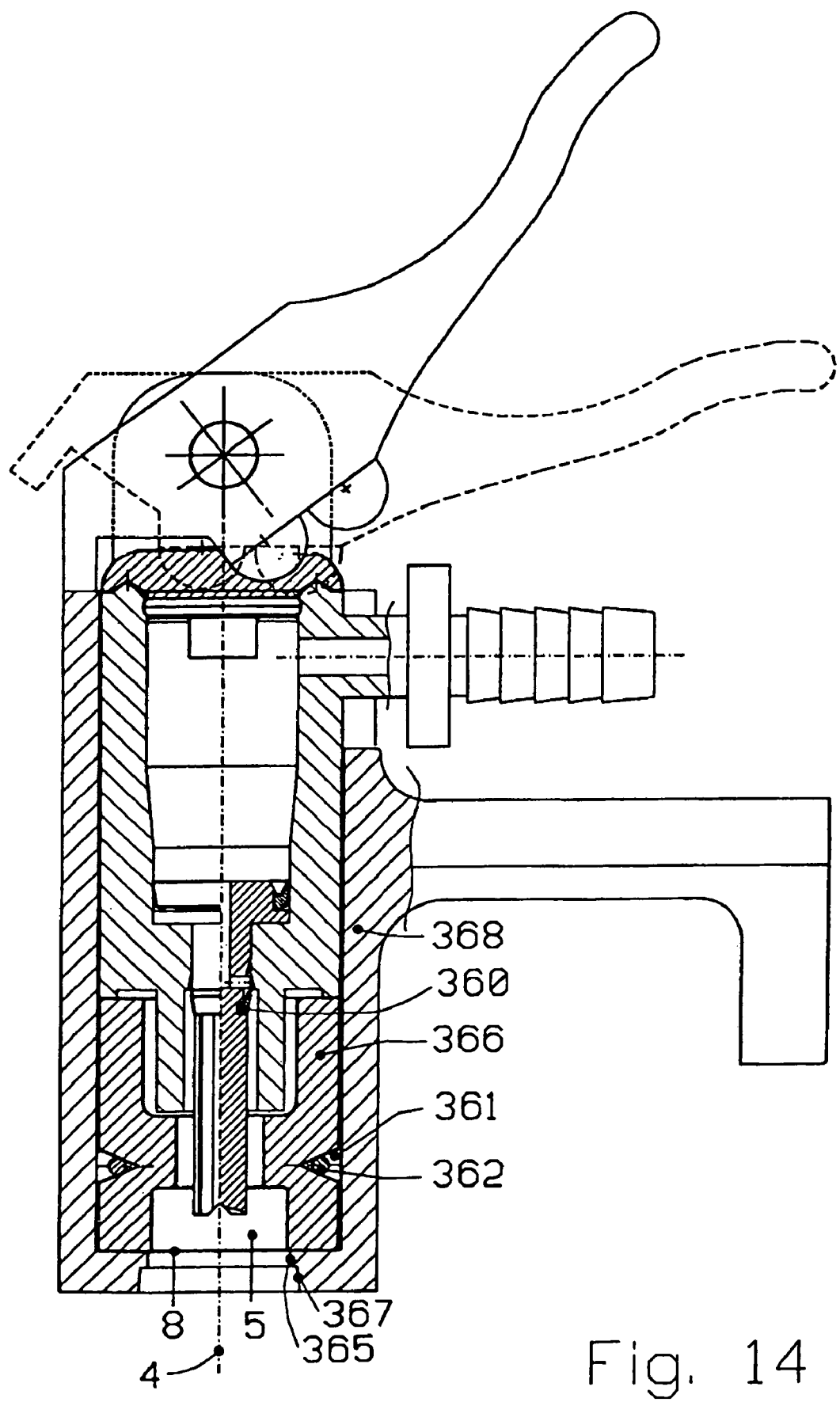
Figure 15:
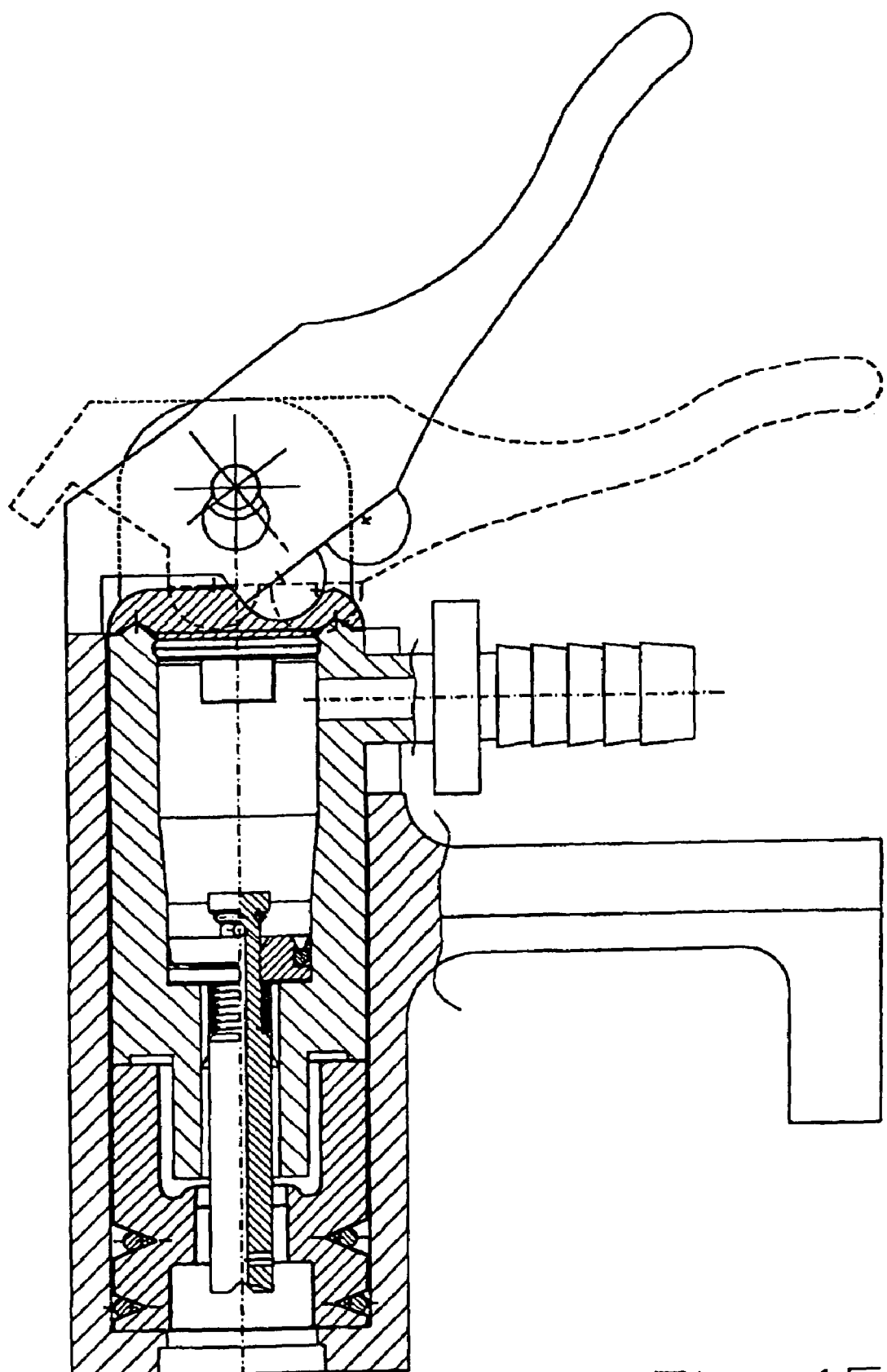
Figure 16:
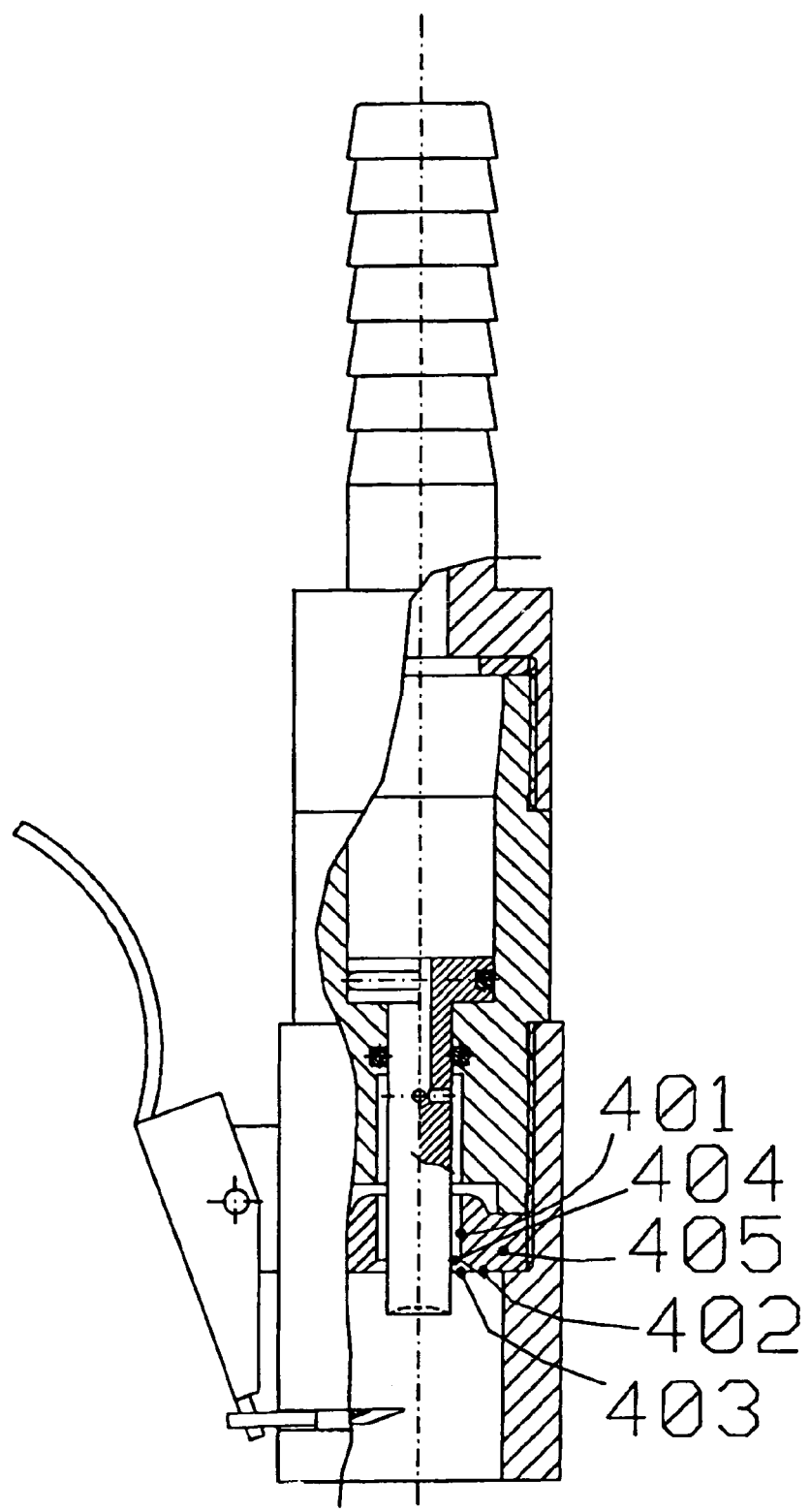
Figure 17:
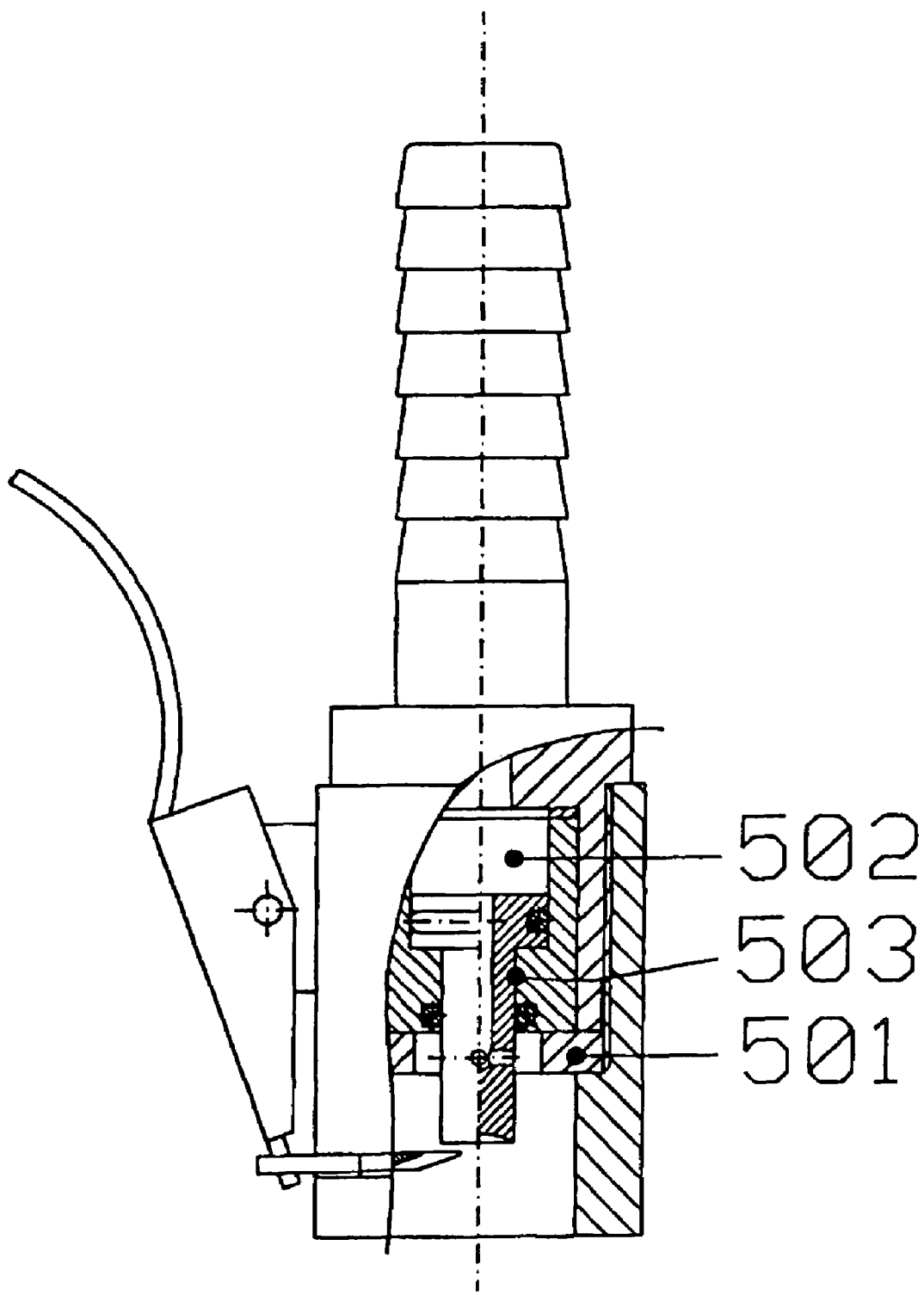

The invention is explained in details below by means of drawings. The drawing shows in:

FIG. 1 the universal connector in the first embodiment connected to the hose of a (high-pressure) foot pump, where the connector is screwed on the valve and a Schrader valve type can be opened by air pressure;

FIG. 2A the connector according to FIG. 1 in a second embodiment where the bushing with a 5V2 thread and a gasket sealing for Schrader can slide parallel to the centre line;

FIG. 2B a rendering of details of the connector according to FIG. 2A, (section A-A);

FIG. 3 the connector according to FIG. 2 in a third embodiment designed to be used on a Sclaverand valve, which is not according to the ISO-standard;

FIG. 4A,B universal connector according to FIG. 1 in a fourth embodiment where the coupling is screwed on the valve, and a Schrader valve can be opened mechanically by means of a pin, where the pin feed mechanism is constructed with a thread and where the pin is shown in the top and bottom position, respectively;

FIG. 5A,B universal connector according to FIGS. 4A, 4B in a fifth embodiment, where the pin feed mechanism is constructed with a big thread pitch, and where the pin is shown in the top and bottom position, respectively;

FIG. 6 a rendering of details of the connector according to FIG. 5A (section X-X) and FIG. 5B, (section Y-Y);

FIG. 7 feed cylinder of the embodiment according to FIG. 5A,5B, (section Z-Z);

FIG. 8 a valve connector according to FIG. 1 in a sixth embodiment, where the coupling is screwed on the valve, and a Schrader valve can be opened automatically by means of a pin being a piston, where the piston is shown in its distal position, where pressurized air can pass through the piston being also a control valve;

FIG. 9 a valve connector according to FIG. 8 in a seventh embodiment, where the piston is equipped with a valve which is levered by an excentric valve lever;

FIG. 10 another connector in an eighth embodiment, where the piston is equipped with a valve which is levered by a concentric valve lever; the piston is shown in a position on the way to the core of a Schrader valve, where the valve on top of the piston is closed;

FIG. 11 universal connector in a ninth embodiment connected to a hose of a (high-pressure) foot pump, where the connector is squeezed on the valve and a Schrader valve can be opened by means of air pressure;

FIGS. 12A,B universal connector in a tenth embodiment, which is a further development of the embodiment of FIG. 5, where the coupling is connected to a hose of a foot pump, and where the coupling is squeezed on the valve, and a Schrader valve can be opened mechanically by means of a movable pin, which is in the top and bottom position, respectively;

FIG. 12C section A-A according to FIG. 12A resp. section B-B according to FIG. 12B—non-essential details are not shown;

FIG. 13 universal connector in a special embodiment made for the purpose of being used in vehicle wheels with a narrow opening for the connector, where the connector is squeezed on the valve, and a Schrader valve is opened by means of the automatically movable pin;

FIG. 14 universal connector in a twelfth embodiment, where the coupling is squeezed on the valve using a rubber bushing with incisions and a torroid ring in each incision, and where a Schrader valve can be opened by means of the automatically movable pin, which is formed as a piston and is shown in the bottom position;

FIG. 15 universal connector in a thirteenth embodiment, where the coupling is squeezed on the valve using a rubber bushing with incisions and a torroid ring in each incision, where the coupling is squeezed on the valve, and a Schrader valve is opened by means of the automatically movable pin, which is formed as a piston with a control valve and is shown in the bottom position;

FIG. 16 the universal connector of FIG. 8, in a fourteenth embodiment, where the "clip-on" type securing means are used, where the valve connector is secured to the valve by means of a beak matching the threads of the valve, thereby establishing temporary threads;

FIG. 17 the connector of FIG. 16, in a fifteenth embodiment, where the activation pin can be shorter.

DESCRIPTION OF PREFERRED EMBODIMENTS

In FIG. 1 the pump hose 1 is mounted on the housing 3 by means of the ring clamp 2. The housing 3 is bent in an angle of e.g. 30°-60° in relation to the centre line 4 of coupling hole 5. The bushing 6 is in the shown embodiment equipped with two ISO thread types: 5V2 thread 7 starting farthest from the opening 8 of the coupling hole 5 and 8V1 thread 9 starting at the above-mentioned opening. At (dis-) connection, the bushing 6 is turned around and is kept in the grooves 11 of the housing 3 by means of grip-hooks 10. The gasket seals 12 and 13 are tightening against the thread types 5V2 and 8V1. The gasket seal 12 is also tightening the crossing 14 between the housing 3 and the bushing 6 when the connector is used on a Schrader valve. The underside of the bushing 6 is equipped with a taper 15.

FIG. 2A shows a second embodiment. The housing 190 is equipped with a coupling bushing 191, which freely and without friction can turn around the housing 190 because of the small space b between the top gasket seal 192 and the bushing 193 together with the connector bushing 191. The gasket seal 194 for the Schrader valve is placed freely in the connector bushing 191, on the thread 8V1195. The bushing 193 with the 5V2 thread is unattached but axially moveable in a taper milling 202 in connector bushing 191. Both can be shifted parallel with the centre line of the valve. The sealing means 200 is embedded in a stepped milling 201 in the housing 190 with an external part 192, which is also tightening the crossing between the housing 190 and the connector bushing 191. The bushing 193 can turn together with the connector bushing 191 as it is equipped with at least two ribs 196 which fit into corresponding grooves 197 (FIG. 2B) in the connector bushing 191. When a Dunlop-Woods or Sclaverand valve is connected, the sealing means 200 is tightening on the minor diameter of the valve thread. The valve is stopped at the edge 198, so that the nut of the Dunlop-Woods valve is not fastening itself on the underside 199 of the 8V1 thread. At the top, the sealing means 200 has a radially stepped, reduced diameter.

FIG. 3 presents another connector designed to be used on a Sclaverand valve, which is not according to the ISO-standard. In such valve some of the threads are removed thereby forming two parallel secants on each side of the Sclaverand type valve. Such Sclaverand type valve can not tighten against the sealing means 330 of the above mentioned valve connectors, as the presurized air will try to escape through the secant openings. The bushing 340 is fastened to the housing 341 by means of detachable locking means 339, reaching into an external grove on the housing 341 perpendicular to the center axis. The internal sealing means 330 and the external sealing means 332 are arranged between the coupling bushing 331 and the housing 341 resp. the bushing 340. The coupling bushing 331 tightens against the undercut grove in the housing 341 assisted by another sealing means 333 fitting into the undercut grove. When mounting the valve connector on the valve, the coupling bushing is running in the undercut grove in the valve housing, and if Sclaverand type valve can not tighten against the sealing means 330, the air will move into the space between the coupling bushing 331 and the other sealing means 333.

FIGS. 4A and 4B show the connector according to FIG. 1, where the pin 161 is built-in in the knob 162, which is kept in a groove 160 of the housing 164 by means of grip-hooks 163. The knob 162 is equipped with internal thread 165 with a large pitch. When the knob 162 is turned around, the pin 161 is shifted axially on the centre line 4 of the opening 8 of the coupling hole 5, as the pin 161 is equipped with fins 166 running in slits 167 of this hole 5. Sealing is done with one gasket seal 168. The knob 162 is made of e.g. elastic material. The pin 161 is shown in FIG. 4A in the top position 18 and in FIG. 4B in the bottom position 32.

In FIG. 5A-7 the pump hose 1 is connected to the housing 35 by means of the ring clamp 2. The angle α between the centre line 36 of the ring clamp 2 and the centre line 4 of the opening 8 of the coupling hole 5 is e.g. 30°-60°. The bushing 6 with internal thread and gasket seals is identical to that of FIG. 1. The pin 40 can move along the centre line 4 of the coupling hole 5 from position 18 to position 32, when the knob 43 is turned from position 44 (FIG. 5A) to position 45 (FIG. 5B) and vice versa. On the underside, the knob 43 is equipped with radially internal, rotating jut 46 surrounding a corresponding bulb 47, and it is locked pivotally in position 44 and 45 when the knob 43 catches the bulb 47: see section X-X (FIG. 6). The cylinder 48 is directly connected to the knob 43. In the cylinder 48 there are two slits 49, 50 of which one 49 is open on the opposite side of the knob 43. The two round protrusions 51, 52 of the pin 40 are moving diametrically opposite each other in the slits 49, 50. At both ends, the slits 49, 50 with the centre lines 53, 54, which are parallel to the centre line 4, have two slits 55, 56, 57, 58, which are placed diametrically opposite each other, where the centre lines 59, 60, 61, 62 lie perpendicularly to the centre lines 53, 54. The slits 55, 56, 57, 58 end in a half circle, of which the centre 63, 64, 65, 66 lies slightly further from the closest side of the slits 49, 50 than the radius of the protrusions 51, 52. Moreover, the protrusions 51, 52 are moving in the internal thread 67 from the coupling hole 5. The thread pitch 67 is so large that the turning knob 43 only has to turn approx. 240° from position 44 to 45 or reversed. When the knob 43 is turned, the slits 49, 50, 55, 56, 57, 58 push the protrusions 51, 52 in the thread 67. The turning knob 43 is fastened on the housing 35 by means of grips 68, which are moving behind an internal jut 69 in the knob. The above-mentioned construction becomes air-tight by means of a gasket seal 70 at the top of the housing 35. On the sides of the housing 35 at the positions 44 and 45 there are symbols 71, 72, 73 of the valve types which can be connected.

In FIG. 8 a section of a valve connector according to the invention is shown in a partial longitudinal section, where the piston 304 is shown in its distal position, in which it presses the core of a Schrader valve to be completely open. In this way, air from the pressure source can pass through the cylinder 303 and e.g. through an central blind drilling 309 positioned axially in the piston 304 and in the piston rod 312, which ends in the piston rod 312 at a branched, radially directed drilling 310, which ends on the other side of a piston control 308 sealed with e.g. an O-ring 311. This arrangement of the drillings ensures a maximum pressure on the piston for the opening of the core of the Schrader valve, after which an opening for air pressure is provided when the core of the Schrader valve is almost entirely open. The piston 304 itself is sealed with another O-ring 305 against the cylinder wall 303, which at an appropriate distance corresponding to at least the stroke of a core of a Schrader valve above the distal piston position is equipped with means 307 for reduction of the sealing. This arrangement is applied in order to make it possible for the air to pass the piston 304 when it is proximally displaced at the application of the valve connector on other valves than Schrader type valves. In this position, the piston rod 312 is also displaced so much from the distal position that the blind drilling 310 is positioned above the sealed part of the cylinder wall 303. The distal part of the piston rod 312 is constantly guided in the piston control 308, and in order to lead air to the valve in question, the piston rod 312 is here equipped with longitudinal air ducts 306, which allow the air to pass the piston rod 312 past the sealed piston control 308 with the O-ring 311.

FIG. 9 show another embodiment of the valve connector according to this invention in a partial longitudinal section, where the piston 304 is equipped with a valve 317 which is levered by an excentric valve lever 315. Here the piston valve 317 is placed on top of the piston 304, where it has a central core pin 318 on the lower side, which at the passage to the valve has partly a radially directed blind drilling 313 and partly an O-ring 314, which provides sealing between the valve 317 and the piston 304. The radially directed blind drilling 313 ends in a central, axially directed blind drilling 309', which goes through the core pin 318 from the blind drilling 313 away from the valve 317. At the distal end of the core pin 318 an extension spring 316 is secured at the distal end of the valve rod 312 and pull to close the valve 317, when this is not subjected to other forces. When the piston 304 is moving in the cylinder 303, piston 304 and valve 317 are concomitant. The valve 317 can be opened when the piston comes closer to its distal position, where a valve lever 315 is stopped by a terminal surface in the cylinder 303. This stops the concomitant movement of piston 304 and valve 317, and then first the sealing 314 and then shortly afterwards the blind drilling 313 are levered above the piston 304. This makes it possible for the compressed air above the piston 304 to escape through the blind drillings 313 and 309'. The compressed air is then led to the core of the Schrader valve which is by now completely open.

FIG. 10 shows another embodiment of the valve connector according to this invention in a partial longitudinal section, where the piston 304 is equipped with a valve 317, which is levered by a concentric valve lever, which here makes up the core pin. The very valve 317 on the piston 304 is constructed as in FIG. 9, and thus not described any further. The piston 304 is shown in a position on its way to the core of a Schrader valve, where the valve 317 on top of the piston 304 is closed. The valve is opened when the core pin 318 depresses the core of the Schrader valve, whereby this is opened concurrently with the opening of the valve 317 itself. Through this, the spring 316' is squeezed together to such an extent that the core pin 318 always can adjust itself to different limits of the core of the Schrader valve.

In FIG. 11 the pump hose 1 is connected to the piston 76, which moves in the housing 110, by means of clamp ring 2. An elastic body 78 with coupling surfaces 79 (for the Dunlop-Woods and the Sclaverand valve) and 80 (for the Schrader valve) is compressed by the movable piston 76 by means of a lever 102, which is pressed down from the top position 82 to the position 83, where it is parallel with the centre line 36 of the ringclamp 2. The lever 102 turns around the axis 85 which is mounted in the housing 110 and to which the axis centre 107 is perpendicular and which intersects the centre line 4 of the opening 8 of the coupling hole 5. The coupling surface 79 lies at a distance 'a' from the opening 8 of the coupling hole 5, while the coupling surface 80 is adjacent to this. The area on the elastic means 78 bears against the piston 76. The piston air supply hole 75 has a diameter which is slightly smaller than the major diameter of the external thread 5V2, so that the Sclaverand valve has a natural stop at its connection. Thus the coupling place for the 5V2 thread is around the 5V2 thread.

When disconnecting, the lever 102 is released. It now automatically turns back to the rest position 82, because the elastic body 78 returns to the unstressed condition. This is possible because the distance of the surface 118 from the axis centre 107 is larger than the distance of the surface 120 of the lever 102 at the top 119 of piston 76. The turn of the lever 102 stops when the plane surface 120 of the lever 102 stops against the flat top 119 of the piston. The top of the lever 102 is in rest position 82 under an angle Ψ of approx. 45° with the centre line 36 of the ring clamp 2. At the opening 8 of the coupling hole 5, the housing 110 is equipped with a cone 15 which facilitates the mounting of the universal connector.

FIGS. 12A, 12B, 12C show the embodiment which is a combination of the connector of FIG. 11 and the construction of the pin of FIG. 5A and FIG. 5B. In FIG. 12A, the pin 142 is shown in its top 18 position and in FIG. 12B in its bottom 32 position. The construction of pin 142 and the way it works is the same as in FIG. 5, except that it is mounted on piston 138 by means of an edge 135 on the lower end of the cylinder 136. The construction of the pin becomes air-tight by means of a gasket seal 139 between the piston 138 and the cylinder 136. The turning knob 140 is equipped with a line 141 indicating the knob 140 position. The valve symbols 71, 72 correspond to the position 18 of the pin 142 and the symbol 73 corresponds to the position 32 of the pin 142 resp. The turning knob 140 is fixed at the valve symbols 71, 72, 73 when the piston fits in a recess 145 (FIG. 12C) in the knob 140 with a bulb 144: see section A-A in FIG. 12A and section B-B in FIG. 12B, resp. Here too, the opening 8 of the coupling hole 5 has the centre line 4.

FIG. 13 shows an universal connector in a special embodiment made for the purpose of being used in vehicle wheels with a narrow opening for the connector, where the connector is squeezed on the valve, and a Schrader valve is opened by means of the automatically moveable pin. In order to ease the use, the lever arm 319 has a special shape, and in the reaction arm 320 there is made a grove 321 for the pressure hose.

FIG. 14 shows an universal connector in an embodiment, where the coupling is squeezed on the valve using a rubber bushing 366 with incisions 361 and a torroid ring 362 in each incision, and where a Schrader valve can be opened by means of the automatically movable pin, which is formed as a piston and is shown in the bottom position. In order to avoid transfer of momentum forces to the vehicle valve, the surface 367 can be slightly cone shaped. The incisions 361 weaken the rubber bushing 366 at the places shown, which causes the rubber bushing to squeeze the threads on the valve precisely where it is most convenient. When, further, torroid rings are arranged in the incisions, the force excerted on the valve threads are increased. Thereby, it is possible to lead air under high pressure (>10 bar) to the valve.

FIG. 15 shows an universal connector in an embodiment like the one in FIG. 14, but where the automatically movable pin is selfadjusting to production tolerances of the Schrader valves.

FIG. 16 shows still another embodiment to be used in connection with the well known "clip-on"-type securing means. The reference numbers of FIG. 8 shall, where the items are not different, be valid for the items of FIG. 16. The valve connector is here secured to a valve by means of the known "beak" matching the threads of the valve, thereby establishing a temporary threads. When the valve connector is connected, the activation pin will function as explained in connection with FIG. 8. If a valve with a 5V2 thread is to be connected, it is important, that the orifice 40 of the inner opening 404 of the sealing means 405 has a shape of a truncated cone in order to guide the threads of the valve. When mounted, the 5V2-valve is sealed by the sealing surface 401 and e.g. the 8V1 is sealed by the sealing surface 402. This embodiment could also with a washer-type sealing means be used for a Schrader valve only.

In this case only the cylindrical space 502 just above the activation pin is necessary and the activation pin can be shorter, as the piston control 503 is positioned adjacent to the sealing means 501, as shown in FIG. 17.

The various embodiments described above are provided by way of illustration only and should not be construed to limit the invention. Those skilled in the art will readily recognize various modifications, changes, and combinations of elements which may be made to the present invention without strictly following the exemplary embodiments and applications illustrated and described herein, and without departing from the true spirit and scope of the present invention.

Advantageous combinations of the features can be the following ones:

A valve connector for inflation valves of vehicle tyres where the connector consists of a housing (3, 16, 19, 35, 77, 110, 134, 151, 164, 190) which partly is connected to a pressure source, preferably a hand or foot pump, and which partly has a coupling hole (5) with a diameter corresponding to the diameter of the valve which is to be connected, where the coupling hole is equipped with a securing means to connect the valve and a sealing means for valves of varying sizes, wherein the sealing means (12, 13, 80, 192, 194) is positioned coaxially in the housing (3, 16, 19, 35, 77, 110, 134, 151, 164, 190) and is established on at least two parallel discrete levels having the housing (3, 16, 19, 35, 77, 110, 134, 151, 164, 190) centre line coaxial to the valve centre line (4) as its normal, where the sealing means minor diameter approximately correspond to the major diameter of the current valve size to which the coupling is connected when used that the sealing means (13, 80, 194) which is closest to the opening (8) of the coupling hole (5) in the housing (3, 16, 19, 35, 77, 110, 134, 151, 164, 190) has the largest minor diameter, whereas the sealing means (12, 79, 192, 200), farthest from the opening (8) of the coupling hole (5) in the housing (3, 16, 19, 35, 77, 110, 134, 151, 164, 190) has the smallest minor diameter, and the diameters between the extremes are in corresponding discrete distances between these extremes.

The securing means can be a rotatable bushing (6) placed on the housing and equipped with threads matching the various valves in the coupling hole (5) and sealed towards the housing (3, 16) with a sealing means (12) which is farthest from the housing (3, 16) coupling hole.

The inner thread can be provided by a bushing (193) with a 5V2 thread where the bushing (193) is embedded slightly axially sliding in a taper milling (202) in the rotational coupling bushing (191) and is coupled rotational-free to the coupling bushing (191) by means of a set of ribs (196), which are distributed around the bushing circumference (193) and which are geared into corresponding grooves (197) in the coupling bushing (191), and that the sealing means (200) on a stepped milling (201).

The inner bushing (331) can run in an undercut grove in the valve housing (341).

In continuation of and coaxially to the housing (19) centre line (4), there can be an activating pin (161) which is fed to activate a central valve pin head in the plug (FIG. 4B) via an axial shifting from a position farthest from the valve (FIG. 4A).

A control knob (162) integrated in the activating pin can be used to control the activating pin (161), and the control knob (162) is rotatably attached to the housing (164) concentric with the activating pin (161) and centrally incorporating this with feeding mechanisms which cooperate with corresponding feeding mechanisms on the activating pin (161) which is rotation-free, but slidingly attached to the housing (164) to ensure the rotation-free, axial shifting of this from an inactive position (FIG. 4A) to an activating position (FIG. 4B).

The control knob (43) can be rotatably attached to the housing (35) concentrically with the activating pin (40) and is centrally incorporating this and is having a cylinder (48), which at suitable feedings reaches out between the housing (35) and the activating pin (40), which is moveably attached to the control knob (43), which can shift in the cylinder (48) and uses feeding mechanisms (51, 52) to reach out between cylinder (48) slits (49, 50) and corresponding feeding mechanisms (67) in the housing (35) to axially shift the activating pin (40) from an inactive position (FIG. 5A) to an activating position (FIG. 5B).

The activating pin in the housing (302) can be constructed as a piston (304) equipped with a suitable securing means and a piston rod (318), which can slide in the cylinder (303) shaped housing (302), and which, without any physical load, is held in a sealing longitudinal position against the cylinder wall, so that the sliding of the piston after the connection of the valve connector (301) occurs by means of the compressed air which is transported from the pressure source, and so that the piston (304) in the position farthest from the wheel valve seals less than 100% against the cylinder wall.

The piston (304) can be constructed as a central, axially sliding valve (317), which is elastically pressed to a closing position towards the top of the piston (304).

The piston valve can be levered with a valve lever which excentricly reaches through the piston (304) and its piston rod (312), and that a spring between the piston (304) and its valve (317) keeps the valve closed, when the piston (304) does not influence the central core pin (301) of the core.

The piston (304) valve (317) can be levered by a core pin (318) which concentricly reaches axially through the piston (304), where it by a spring (316') is transported to a position distant from the piston (304).

The securing means and the sealing means can consist of a bushing placed in the housing (110) and made of a deformable material, preferably a rubber type material, and that proximally to the valve and the bushing, a piston (76) with two extremes in order to obtain an axial compression and release of the bushing has been placed together with a lever (102) for activation of the piston (76), where the lever (102) axis (85) is extended perpendicularly to the centre line (4) through this, and that the lever (102) for piston activation is shifted from a position (82) forming an angle (Ψ) with the centre line (4) to a position (83) approximately perpendicular to the centre line, where a locking means works together with a corresponding locking means on the lever (102).

In continuation of and coaxially to the centre line (4) of the housing (134), an activating pin (142) can be arranged which through axial shifting from a position farthest from the valve (FIG. 12A) is fed to activate a central valve pin head in the plug (FIG. 12B), and that the lever (102) is U-shaped and the free ends of the U-legs are embedding the axis (85) of the lever (102).

A control knob (140) connected to the activating pin (142) can be used to control the activating pin, and that the control knob (140) is rotatably attached to the piston (138) concentrically with the activating pin (142) and is centrally incorporating this and is having feeding mechanisms which work together with corresponding feeding mechanisms on the activating pin (142) which is shiftably attached to the piston to axially shift the activating pin from an inactive position (FIG. 12A) to an activating position (FIG. 12B) and that the lever (102) is U-shaped and the free ends of the U-legs are embedding the axis (85) of the lever (102).

The control knob (140) can rotatably be attached to the piston (138) concentrically with the activating pin (142) and is centrally incorporating this and is having a cylinder (48), which with suitable guiding means reaches in between the piston (138) and the activating pin (142) which is moveably attached to the control knob (140) and which can be moved in the cylinder (48) and reaches out with protrusions (51, 52) through slits (49, 50) in the cylinder (48) and in corresponding feeding means (67) in the piston (138) to axially shift the activating pin (142) from an inactive position (18) to an activating position (32).

The invention claimed is:

1. A valve connector for coupling with inflation valves of vehicle tires, comprising
  a housing,
  within the housing a coupling hole for coupling with an inflation valve, the coupling hole having a central axis and an outer opening,
  an activating pin, which is arranged coaxially with the coupling hole, for depressing a central spring-force operated core pin of the inflation valve,
  a pressure port which is connected to a pressure source, wherein
  the activating pin is shiftable between a proximal pin position and a distal pin position so as to depress the core pin of the inflation valve in its distal pin position and disengage the core pin of the inflation valve in its proximal pin position
  the activating pin is coupled with a piston and the piston is slidingly arranged in the cylinder and is movable between a proximal piston position, which corresponds to the proximal pin position, and a distal piston position, which corresponds to the distal pin position, wherein
  the piston is disposed between the pressure port and the coupling hole and is drivable from its proximal piston position to its distal piston position by the pressure from the pressure source, and
  a flow path through the piston and through at least a portion of the activating pin, wherein piston motion to the proximal piston position blocks said flow path and piston motion to said distal position opens said flow path.

2. Valve connector according to claim 1, wherein the flow path is interrupted between said proximal and distal piston positions in third piston positions which correspond to intermediate pin positions in which the core pin is engaged by said activating pin.

3. Valve connector according to claim 1, comprising at least one seal positioned between
  said piston and a cylinder formed by an inner wall of said housing when the piston is in its proximal and third piston positions.

4. Valve connector according to claim 3, wherein the piston is movable further beyond said proximal piston position into a fourth piston position in which the piston is farther away from the outer opening of the coupling hole than in the proximal piston position and the inner wall of said housing comprises a channel enabling the conduction of compressed air past the edge of said piston when said piston is in its fourth piston position.

5. Valve connector according to claim 3 wherein the housing comprises a piston control for guiding the movement of said piston and of the activating pin in the direction of the central axis of the coupling hole.

6. Valve connector according to claim 3, wherein the housing comprises a cylinder wall for guiding the movement of said piston and the activating pin in the direction of the central axis of the coupling hole.

7. Valve connector according to claim 5, comprising at least one additional seal located to seal the outer surface of the activating pin against the surface of said piston control.

8. Valve connector according to claim 4, wherein
  the activating pin comprises a duct enabling the conduction of compressed air past the activating pin when said piston is in its fourth piston position.

9. Valve connector according to claim 3, wherein the activating pin is coupled with the piston through a piston rod and said flow path comprises a channel through the piston and piston rod that connects the cylinder to an orifice on the surface of said piston rod, wherein the mutual positioning of said orifice and said seal is such that
  said orifice is closer to the coupling hole than said seal when said piston is in its distal piston position thereby freeing the flow path through said channel between said cylinder and the coupling hole when said piston is in said distal piston position and said seal is closer to the coupling hole than said orifice when said piston is in its proximal piston position thereby interrupting said flow path through said channel between said cylinder and the coupling hole when said piston is in said distal piston position and in said third piston positions.

10. Valve connector according to claim 1, comprising a valve mounted centrally within said piston and being axially movable in relation to said piston between a closed valve position and an open valve position.

11. Valve connector according to claim 10, wherein said valve is pulled by an extension spring towards said closed valve position and comprises a valve lever extending eccentrically through said piston for pushing said valve towards said open valve position when said piston is in said distal position.

12. Valve connector according to claim 10, wherein the activating pin is coupled with the piston through a piston rod and said valve comprises
 a central pin extending concentrically through said piston and piston rod and
 a compression spring for pushing said valve towards said closed valve position.

13. Valve connector according to claim 1 wherein
 said coupling hole includes at least two coupling hole sections which are axially displaced from each other and have different diameters, with the larger diameter coupling hole section closer to said outer opening than the smaller diameter hole section, and
 a first sealing portion and a second sealing portion situated coaxially with the center axis of the coupling hole at different levels along the center axis, with said first sealing portion disposed at and assigned to the larger coupling hole section and said second sealing portion disposed at and assigned to the smaller coupling hole section.

14. Valve connector according to claim 13 comprising:
 a lever arm that is movable between a rest position and an activation position, and
 within the coupling hole a deformable bushing;
 wherein said deformable bushing is arranged to be influenced by the movement of said lever arm so that it becomes deformed when said lever arm is in said activation position and not deformed when said lever arm is in said rest position, the deformed state corresponding to the formation of temporary securing thread onto the surface of said deformable bushing when the inflation valve is coupled in the coupling hole.

15. A pump for human-powered operation by hand or foot for inflating a vehicle tire, said pump comprising a valve connector according to claim 1.

* * * * *